(12) United States Patent
Herpy et al.

(10) Patent No.: US 12,740,504 B2
(45) Date of Patent: Sep. 22, 2026

(54) BRUSHED SLIP HOLDER AND OPERATIONAL MECHANISMS

(71) Applicant: Motivo Engineering, LLC, Gardena, CA (US)

(72) Inventors: Alex Herpy, Long Beach, CA (US); Stephen Babin, Sagle, ID (US); Bryan Yaggi, Georgetown, TX (US); Will Church, Washington, DC (US)

(73) Assignee: Motivo Engineering, LLC, Gardena, CA (US)

( * ) Notice: Subject to any disclaimer, the term of this patent is extended or adjusted under 35 U.S.C. 154(b) by 507 days.

(21) Appl. No.: 18/319,998

(22) Filed: May 18, 2023

(65) Prior Publication Data

US 2023/0380334 A1 Nov. 30, 2023

Related U.S. Application Data

(60) Provisional application No. 63/345,810, filed on May 25, 2022.

(51) Int. Cl.
*A01C 11/00* (2006.01)
*B65G 17/32* (2006.01)

(52) U.S. Cl.
CPC ............ *A01C 11/006* (2013.01); *B65G 17/32* (2013.01)

(58) Field of Classification Search
CPC .............................. A01C 11/006; B65G 17/32
See application file for complete search history.

(56) References Cited

FOREIGN PATENT DOCUMENTS

JP 2004313127 A * 11/2004 ............. A01C 11/02

* cited by examiner

*Primary Examiner* — Matthew R Buck
(74) *Attorney, Agent, or Firm* — Rutan & Tucker LLP; Hani Z. Sayed

(57) ABSTRACT

Apparatuses, systems, and methods are provided for transplanting slips with an automated slip transplanter. The transplanter comprises a planter unit, a singulation unit, a conveyor belt, a node sensor, and a controller. The planter unit is configured to plant consistent rows of evenly spaced slips in a field. The singulation unit comprises automated grippers and slip cartridges, and is configured to continuously singulate harvested slips stored in the slip cartridges. The conveyor belt is configured to receive the singulated slips from the automated grippers with brushed holders, and transfer the received slips on a belt to the planter unit. The node sensor is configured to autonomously collect performance data of the singulated slips in real-time. The controller is communicatively coupled to the node sensor, and configured to implement operational modes and dynamically adjust a planting slip rate based on the operational modes and performance data collected by the node sensor.

20 Claims, 21 Drawing Sheets

260b
274
274
203

215
260a
252b
254
258
245
252c
235
256c
260b
264c
262c
203

274
266
203

260b
266
203
274
254

220
295
401
190
192

250
295
192
205
190

400
160
210
211
220

160
192
190
205
220
210
203
210
600
495

BRUSHED SLIP HOLDER AND OPERATIONAL MECHANISMS

PRIORITY

This application claims the benefit of and priority to U.S. Provisional Application, entitled "Brushed Slip Holder And Operational Mechanisms," filed on May 25, 2022, and having application Ser. No. 63/345,810, the entirety of said application being incorporated herein by reference.

FIELD

Embodiments of the present disclosure generally relate to transplanting machines. More specifically, the embodiments of the disclosure relate to an automated slip transplanter having one or more brushed slip holder assemblies and operational mechanisms.

BACKGROUND

As the increasing demand for produce continues to upsurge, agricultural industries drive to mitigate demand issues by bringing automation to many decades-old harvesting issues, such as increased labor scarcity, rising costs, and so on. One example of these issues is faced with transplanters (e.g., slip transplanters), which generally require: (i) improved transplanting speeds and qualities, (ii) reduced labor expenses including reduced operator hours, and (iii) increased robustness and reliability for the lifetime of the transplanting machine. Furthermore, a typical transplanting season occurs over 10 weeks, requiring hundreds of laborers and operators to keep up with the pace of approximately 500,000 slips/hour during the limited windows of cooperative weather. To further complicate these issues, planting season typically occurs once a year—and it does not always occur as expected.

For example, sweet potatoes have a unique lifecycle, one that has prohibited automation until recent developments. The main issue with the sweet potato involves the "slip" that is approximately one foot long, known as a highly variable plant stem harvested from the mother bed potatoes, and individually transplanted into the growing fields at the start of each season. Traditionally, only human hands have been capable of gently manipulating individual slips—without tearing their leaves and/or tangling multiple slips—and then inserting the individual slips into the ground.

Accordingly, there is a need for an automated transplanter capable of taking bulk stored harvested slips from a minimal operating crew and outputting a consistent planted row of evenly spaced transplanted slips to thereby improve various operational processes, such as labor costs, yield opportunities, and field utilization. In addition, there is a need for an automated transplanter having a brushed slip holder assembly capable of: (i) gently receiving/manipulating individual slips without requiring human hands and tearing their leaves, and (ii) seamlessly singulating individual slips without tangling multiple slips. As such, there is a need for an automated transplanter with a brushed slip holder assembly to thereby overcome these harvesting issues and achieve improved automation, increased production efficiency, and reduced high labor costs and operator hours.

SUMMARY

Apparatuses, systems, and methods are provided for transplanting slips with an automated slip transplanter. The transplanter comprises a planter unit, a singulation unit, a conveyor belt, a node sensor, and a controller. The planter unit is configured to plant consistent rows of evenly spaced slips in a field. The singulation unit comprises automated grippers and slip cartridges, and is configured to continuously singulate harvested slips stored in the slip cartridges. The conveyor belt is configured to receive the singulated slips from the automated grippers with brushed holders, and transfer the received slips on a belt to the planter unit. The node sensor is configured to autonomously collect performance data of the singulated slips in real-time. The controller is communicatively coupled to the node sensor, and configured to implement operational modes and dynamically adjust a planting slip rate based on the operational modes and performance data collected by the node sensor.

In an exemplary embodiment, a brushed slip holder assembly comprises: a slip bristle holder having a first body, a plurality of first legs, and a first opening, wherein the first opening is disposed through a center section of the first body, and each of the plurality of first legs is disposed over one of four corner sections of the first body; a belt holder base disposed under the slip bristle holder, the belt holder base having a second body, a first hinged section, and one or more second openings, wherein the one or more second openings are disposed through a center section of the second body; and an intermediate double-sided hinge disposed between the slip bristle holder and the belt holder base, the intermediate double-sided hinge used to operably couple the slip bristle holder onto the belt holder base, wherein the intermediate double-sided hinge has a third body, a second hinged section, a third hinged section, and fourth opening, wherein the fourth opening is disposed through a center section of the third body.

In another exemplary embodiment, the automated slip transplanter further comprises a belt slip holder having a fourth body, a plurality of second legs, and a fifth opening, wherein the fifth opening is disposed through a center section of the fourth body, and each of the plurality of second legs is disposed on one of four corner sections of the second body. In another exemplary embodiment, the belt slip holder is disposed over the intermediate double-sided hinge, and wherein the belt slip holder is operably coupled to the third hinged section of the intermediate double-sided hinge with a hinged pin. In another exemplary embodiment, the fourth body of the belt slip holder is disposed vertically over and perpendicular to both the first body of the slip bristle holder and the third body of the intermediate double-sided hinge.

In another exemplary embodiment, the automated slip transplanter further comprises one or more bristle sections coupled to and disposed over the first body of the slip bristle holder. In another exemplary embodiment, each of the bristle sections is operably coupled to one of the plurality of first legs of the slip bristle holder. In another exemplary embodiment, each of the bristle sections has a head section and a body section. In another exemplary embodiment, each of the first legs of the slip bristle holder has an inner opening used to surround and operably engage with each of the head sections of the bristle sections, and wherein each of the body sections of the bristle sections extends outwardly away from the head section and inner opening, wherein each end of the body sections is disposed adjacent to another end of the body sections, and wherein the one end of the body sections is separated from the other end of the body sections by a minimal space in between both ends of the respective body sections. In another exemplary embodiment, the automated slip transplanter further comprises one or more tension springs operably coupled to the first hinged section of the bristle holder base and the second hinged section of the intermediate double-sided hinge, wherein the second hinged section of the intermediate double-sided hinge is operably coupled to the first hinged section of the bristle holder base with a first hinged pin.

In an exemplary embodiment, an automated slip transplanter comprises: a planter unit configured to plant a consistent row of evenly spaced slips in a field; a singulation unit having a plurality of automated grippers and a plurality of slip cartridges, the singulation unit configured to continuously singulate harvested slips that are stored in the plurality of slip cartridges; and a conveyor belt having a belt and a plurality of brushed slip holder assemblies pivotally coupled to and disposed on the belt, the plurality of brushed slip holder assemblies are configured to receive the singulated slips from the plurality of automated grippers, and the belt is configured to transfer the received slips to the planter unit using the plurality of brushed slip holder assemblies; wherein each of the plurality of brushed slip holder assemblies further comprises: a slip bristle holder having a first body, a plurality of first legs, and a first opening, wherein the first opening is disposed through a center section of the first body, and each of the plurality of first legs is disposed over one of four corner sections of the first body; a belt holder base disposed under the slip bristle holder, the belt holder base having a second body, a first hinged section, and one or more second openings, wherein the one or more second openings are disposed through a center section of the second body; and an intermediate double-sided hinge disposed between the slip bristle holder and the belt holder base, the intermediate double-sided hinge used to operably couple the slip bristle holder onto the belt holder base, wherein the intermediate double-sided hinge has a third body, a second hinged section, a third hinged section, and fourth opening, wherein the fourth opening is disposed through a center section of the third body.

In another exemplary embodiment, the planter unit comprises a sword assembly and an open rail assembly, wherein the conveyor belt is configured to sequentially transfer the received slips to an open rail track of the open rail assembly, and wherein the open rail track is configured to deliver the singulated slips to the sword assembly, such that the sword assembly thereby plants the consistent row of evenly spaced slips in the field. In another exemplary embodiment, the conveyor belt is operably coupled to the singulation unit and the planter unit, wherein the singulation unit is vertically disposed on the planter unit, and wherein each of the plurality of automated grippers are configured to singularly grasp a harvested slip from one of the plurality of slip cartridges and discharge each of the singulated slips on the conveyor belt. In another exemplary embodiment, each of the brushed slip holder assemblies further comprises a belt slip holder having a fourth body, a plurality of second legs, and a fifth opening, wherein the fifth opening is disposed through a center section of the fourth body, and each of the plurality of second legs is disposed on one of four corner sections of the second body.

In another exemplary embodiment, each of the brushed slip holder assemblies further comprises one or more tension springs operably coupled to the first hinged section of the bristle holder base and the second hinged section of the intermediate double-sided hinge, wherein the second hinged section of the intermediate double-sided hinge is operably coupled to the first hinged section of the bristle holder base with a first hinged pin. In another exemplary embodiment, the belt slip holder is disposed over the intermediate double-sided hinge, and wherein the belt slip holder is operably coupled to the third hinged section of the intermediate double-sided hinge with a hinged pin. In another exemplary embodiment, the fourth body of the belt slip holder is disposed vertically over and perpendicular to both the first body of the slip bristle holder and the third body of the intermediate double-sided hinge.

In another exemplary embodiment, each of the bristle sections is operably coupled to one of the plurality of first legs of the slip bristle holder. In another exemplary embodiment, the automated slip transplanter further comprises one or more bristle sections coupled to and disposed over the first body of the slip bristle holder. In another exemplary embodiment, each of the bristle sections has a head section and a body section. In another exemplary embodiment, each of the first legs of the slip bristle holder has an inner opening used to surround and operably engage with each of the head sections of the bristle sections, and wherein each of the body sections of the bristle sections extends outwardly away from the head section and inner opening, wherein each end of the body sections is disposed adjacent to another end of the body sections, and wherein the one end of the body sections is separated from the other end of the body sections by a minimal space in between both ends of the respective body sections.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
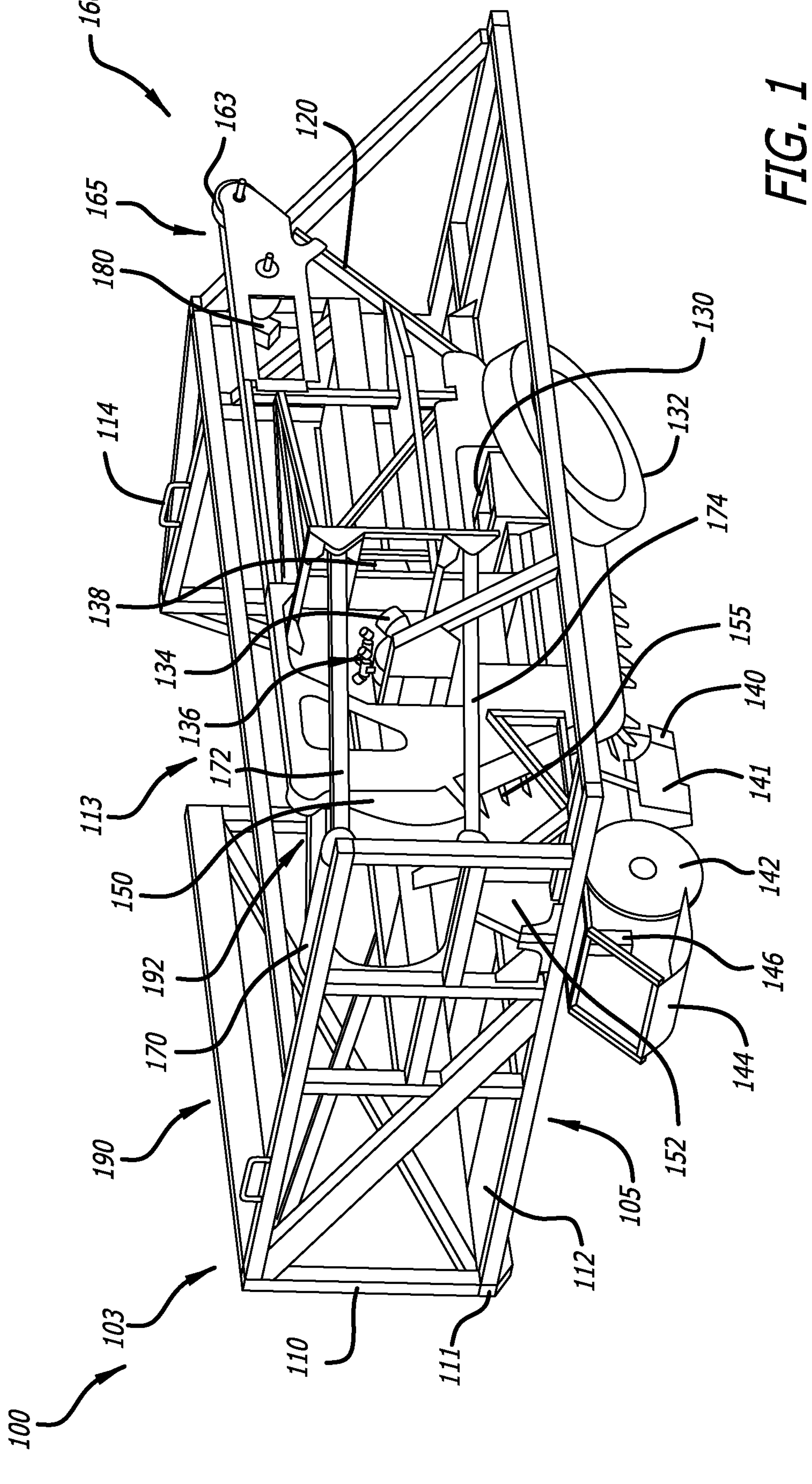
FIG. 1 illustrates an isometric view of an exemplary embodiment of an automated transplanting system with an automated transplanter having a plurality of brushed slip holder assemblies and operational mechanisms, in accordance with an embodiment of the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as a "first operational mode," may be made. However, the specific numeric reference should not be interpreted as a literal sequential order but rather interpreted that the "first operational mode" is different than a "second operational mode." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

As the ever-increasing demand for produce continues to upsurge, agricultural industries drive to mitigate demand issues by bringing automation to many decades-old harvesting issues, such as increased labor scarcity, rising costs, and so on. One example of these issues is faced with transplanters (e.g., slip transplanters), which generally require: (i) improved transplanting speeds and qualities, (ii) reduced labor expenses including reduced operator hours, and (iii) increased robustness and reliability for the lifetime of the transplanting machine. Furthermore, a typical transplanting season occurs over 10 weeks, requiring hundreds of laborers and operators to keep up with the pace of approximately 500,000 slips/hour during the limited windows of cooperative weather. To further complicate these issues, planting season typically occurs once a year—and it does not always occur as expected.

For example, sweet potatoes have a unique lifecycle, one that has prohibited automation until recent developments. The main issue with the sweet potato involves the "slip" that is approximately one foot long, known as a highly variable plant stem harvested from the mother bed potatoes, and individually transplanted into the growing fields at the start of each season. Traditionally, only human hands have been capable of gently manipulating individual slips—without tearing their leaves and/or tangling multiple slips—and then inserting the individual slips into the ground.

In addition, typical planting depths for agricultural crops, such as sweet potato slips, may vary based on weather, topography, irregular harvesting season, and so on. Generally, one of the transplanter's objectives is to place the slips into the well-drained, warm soil at a consistent depth to achieve uniform emergence. That is, germination and emergence may be optimized when the planting depth is controlled, consistent, and manually adjusted for planting in optimal soil properties. During, for example, maintenance operations of the transplanter, one or more adjustments of the actuator and other depth controlling components may be required to achieve the desired planting depth. Unfortunately, such adjustments to the transplanter are usually performed manually, and thus these manual adjustments are likely prone to human error and inconsistencies, which may then require more considerable resources, maintenance, and time.

Also, as noted above, moisture and temperature vary spatially within fields and within the top three inches of the soil due to soil texture, topography, geography, crop usage, irrigation patterns, residue cover, and a variety of other agricultural factors. As such, many growers and transplanters must occasionally compromise one factor for another, such as planting shallower/deeper into warmer/colder soil than desirable. Accordingly, there is a need for an automated transplanter capable of taking bulk stored harvested slips from a minimal operating crew and outputting a consistent planted row of evenly spaced transplanted slips to thereby improve various operational processes, such as labor costs, yield opportunities, and field utilization. In addition, there is a need for an automated transplanter having a brushed slip holder assembly capable of: (i) gently receiving/manipulating/collecting individual slips without requiring human hands and tearing their leaves, and (ii) seamlessly singulating individual slips without tangling multiple slips. As such, there is a need for an automated transplanter with a brushed slip holder assembly to thereby overcome these harvesting issues and achieve improved automation, increased production efficiency, and reduced high labor costs and operator hours.

Embodiments disclosed herein provide one or more apparatuses, systems, and methods for autonomously transplanting slips with an automated slip transplanter. Furthermore, several embodiments disclosed herein provide brushed slip holder assemblies of the automated slip transplanter to autonomously and gently collect individual slips from the slip cartridges with the automated grippers to thereby seamlessly singulate the collected individual slips and dynamically target a predetermined number of nodes per slip for maximal plant yield implementation. In most embodiments, the automated slip transplanter may comprise a planter unit, a singulation unit, a plurality of brushed slip holder assemblies, a conveyor belt, and/or a controller. In some embodiments, the planter unit may be implemented as a floating frame assembly that includes a floating frame, a sword assembly, an open rail assembly, and a closing wheels assembly. For example, the planter unit may be supported by one or more wheels of the closing wheels assembly. In some embodiments, the singulation unit may include one or more singulation mechanisms, such as automated grippers configured to singularly grasp slips from multiple slip cartridges and discharge (or release) the singulated slips to the automated brushed slip holder assemblies located on the conveyor belt, which is operably coupled to the singulation unit and planter unit.

The brushed slip holder assemblies may be implemented in conjunction with the conveyor belt, where the brushed slip holder assemblies may include one or more belt slip holders and brushed slip holders, and the conveyor belt may include one or more belt(s). For example, the belt slip holders may be hinged to the belt(s), such that the brushed slip holders may thus be guided (or moved) with the belt to autonomously receive/collect the singulated slips and then transfer (or convey) them consistently towards the planter unit. As such, the automated brushed slip holder assemblies may be implemented to enable the transplanter to overcome various challenging harvesting issues such as breaking slips, tearing the leaves of the slips, planting multiple slips at a time, etc., which may ultimately allow the transplanter to achieve improved automation, increased production efficiency and overall plant yield, and reduced high labor costs and operator hours. For example, the transplanter may be capable of overcoming such issues by implementing the brushed slip holder assemblies to collect individual slips—without requiring human hands and tearing their leaves—as well as seamlessly singulate the collected individual slips without tangling or damaging any of the slips.

In several embodiments, as set forth below in greater detail, the brushed slip holder assembly may include:

A brushed slip holder assembly, comprising:

- a slip bristle holder having a first body, a plurality of first legs, and a first opening, wherein the first opening is disposed through a center section of the first body, and each of the plurality of first legs is disposed over one of four corner sections of the first body;
- a belt holder base disposed under the slip bristle holder, the belt holder base having a second body, a first hinged section, and one or more second openings, wherein the one or more second openings are disposed through a center section of the second body; and
- an intermediate double-sided hinge disposed between the slip bristle holder and the belt holder base, the intermediate double-sided hinge used to operably couple the slip bristle holder onto the belt holder base, wherein the intermediate double-sided hinge has a third body, a second hinged section, a third hinged section, and fourth opening, wherein the fourth opening is disposed through a center section of the third body.

Furthermore, as described below in greater detail, the transplanter may include a node sensor (e.g., a sensor capable of implementing neural network processes) that is associated with the planter unit, the singulation unit, and the conveyor belt, the node sensor configured to autonomously collect performance data of the singulated slips in real-time. Furthermore, in these embodiments, the node sensor may be communicatively coupled to the controller, such that the controller may be capable of dynamically adjusting a planting slip rate based on the one or more operational modes (e.g., the active node control planting mode) and the performance data collected by the node sensor. For example, the controller may be configured to actively control at least one or more of the planter unit, the singulation unit, and the conveyor belt in order to dynamically adjust the planting slip rate, where the controller may actively control and dynamically adjust the planting slip rate to thereby maintain a predetermined overall planting slip rate.

Lastly, as discussed in the embodiments below, the controller may be configured to actively target a predetermined number of nodes per slip based on the predetermined overall planting slip rate and the performance data collected by the node sensor. In several embodiments, the node sensor may be configured to monitor and collect any number and types of performance data points including, but not limited to, a node count, a singulation rate, a population value, a number of skipped slips, a number of multiple slips, a slip spacing rate, and a belt speed. For example, as used herein, the "planting slip rate" may refer to the number of slips (or plants) that may need to reach maturity to maximize yield. Whereas, as used herein, the population value (or the slip/plant population) may refer to the number of slips/plants that have been planted per acre. As such, the "planting slip rate" may ultimately refer to the number of slips (or nodes per slip) planted per acre in order to attain the overall desired (or predetermined) plant population value.

Referring now to FIG. 1, an isometric view illustration of a transplanting system 100 is shown, in accordance with embodiments of the disclosure. In these embodiments, as shown in FIG. 1, the transplanting system 100 may be implemented as a slip transplanting system comprising, but not limited to, an articulator 105 (e.g., a tractor) and an automated slip transplanter 103 (hereinafter, may be referred to as the "transplanter"). It should be understood that the automated slip transplanter 103 is capable of transplanting sweet potato slips, however it is not limited to only sweet potato slips and may be configured to transplant any other planting node/slip if desired, without limitations. In most embodiments, the transplanting system 100 may include the transplanter 103 mounted to the articulator 105, where the articulator 105 may be supported by one or more drive wheels (not shown). In an embodiment, the transplanter 103 may have a hitch (or a first hitch) pivotally hitched to a hitch (or a second hitch) of the articular 105, where the hitches (not shown) may be a point hitch, a tongue, and/or any similar hitching/towing mechanism. Additionally, in some embodiments, the articulator 105 may tow the transplanter 103 around a field and provide power to the transplanter 103 (e.g., via a power take off ("PTO")) for powering the operations of the transplanter 103).

As described herein, the embodiments of the transplanter 103 may be used for an automated slip transplanter (or mostly/semi-automated transplanter), which may be implemented to: (i) actively manage a depth planting mode capable of dynamically adjusting a planting depth in real-time, (ii) actively manage a node planting mode capable of dynamically and autonomously targeting a predetermined number of nodes per slip, and/or (iii) actively control/manage a buffering mode capable of facilitating slip rejection and buffering input. As such, the transplanter 103 may thereby be used to substantially improve existing transplanting systems, machines, and/or processes by ensuring maximum field utilization, optimal per slip (or plant) yield implementation, and substantial cost-effective techniques, such that, for example, the labor costs and operator hours are significantly reduced.

Furthermore, in accordance with most embodiments, the transplanter 103 may be used to take bulk stored harvested slips from a minimal operating crew and output one or more consistent planted rows of evenly spaced transplanted slips. In some embodiments, the transplanter 103 may be configured to plant any desired number of rows including, but not limited to, one row, two rows, four rows, and/or eight rows. For example, although one transplanter 103 may be depicted in FIG. 1, it should be understood that two or more transplanters 103—and/or any number of transplanters 103 such as two transplanters, three transplanters, and so on—may be implemented together to plant any number of desired of rows at once, without limitations. Furthermore, in accordance with several other embodiments, the transplanter 103 may be configured to autonomously carry out one or more operational modes in real-time to actively control and adjust a planting depth, a planting angle, a targeted node count, a planting slip rate, and/or any other desired transplanting configuration. That is, in several embodiments, the operational modes implemented by the transplanter 103 may include, but are not limited to, an active depth control planting mode, an active node control planting mode, a slip rejection/buffering mode, and so on.

As illustrated in FIG. 1, the transplanter 103 may comprise, but is not limited to, a planter unit 110, a singulation unit 190, a conveyor belt unit 160, a node sensor 192 (e.g., a sensor capable of implementing a neural network and/or the like), and one or more controllers 136 (or controller devices, lines, etc.) (e.g., as shown with the controller 295 of the singulation unit 190 depicted in FIGS. 4A-4B, and the main controller 705 depicted in FIG. 7). It should be understood that one or more of these units/assemblies 110, 190, 160, 193, 136 may be better illustrated in greater detail in the following Figures depicted below. In addition, although FIG. 1 depicts one specific view, illustration, and assembled configuration of the various components and subassemblies of the transplanter 103, it should be appreciated that more or less mechanisms may be used, that one or more mechanisms may be positioned differently (or in different locations), that one or more assemblies/sub-assemblies may be assembled differently and using more or less mechanisms, and that one or more mechanism, assemblies, and/or sub-assemblies may be assembled using different techniques, sizes, etc., without limitations.

The transplanter 103 may have the singulation unit 190 operably coupled to the planter unit 110, where the singulation unit 190 may be disposed on or over the planter unit 110. In some embodiments, the singulation unit 190 may include one or more singulation mechanisms that are depicted below in FIGS. 4A-4B and 5-7, such as automated grippers (or robotic arms, fingers, etc.) configured to singularly grasp slips from multiple slip cartridges and discharge/release them onto the conveyor belt 160. Furthermore, as shown below in FIGS. 5-6, the conveyor belt 160 may be operably coupled to the singulation unit 190 and the planter unit 110. For example, the conveyor belt 160 may have a continuous belt with multiple hinged brushed slip holders (e.g., as shown with the belt holder assembly 203, depicted in FIG. 2B, which includes the belt 210 and the other slip holder mechanisms 215, 225, 235, 245), where the brushed slip holders may be configured to receive the singulated slips and then transfer/convey them down towards the planter unit 110. Note that, as noted above, it should be understood that the singulation unit 190, the conveyor belt 160, and the one or more controllers may be described in greater detail below.

Continuing with the illustration of FIG. 1, the planter unit 110 may be configured as a floating frame assembly that includes, but is not limited to, a side rail frame 111, a floating frame 120, a closing wheels assembly 130, a drive actuator assembly (or active suspension assembly) 134, a suspension assembly (or shock and spring assembly) 138, a sword assembly 140, an open rail assembly 150, a drive timing pully assembly 163 with a timing pully belt 165, and a drive motor 180. In some embodiments, the side rail frame 111 may be implemented as a bottom body frame/chassis of the transplanter 103 that may be rigid/robust and has an extended lifecycle.

As shown in FIG. 1, the illustrated side rail frame 111 may surround/house the floating frame 120 and be pivotally coupled to and supported (or maneuvered) by the closing wheels 132 of the closing wheels assembly 130. According to several embodiments, the side rail frame 111 may be coupled to the floating frame 120 via a four-bar mount plate 170, two upper linkage bars 172, and two lower linkage bars 174. In some embodiments, the side rail frame 111 may be configured with a platform 112, an opening 113 for the platform 112, and a pair of handles 114, where the platform 112 may support an operator (if desired) and/or store bulk harvested slips, slip cartridges, and so on.

Figures 4A, 4B:
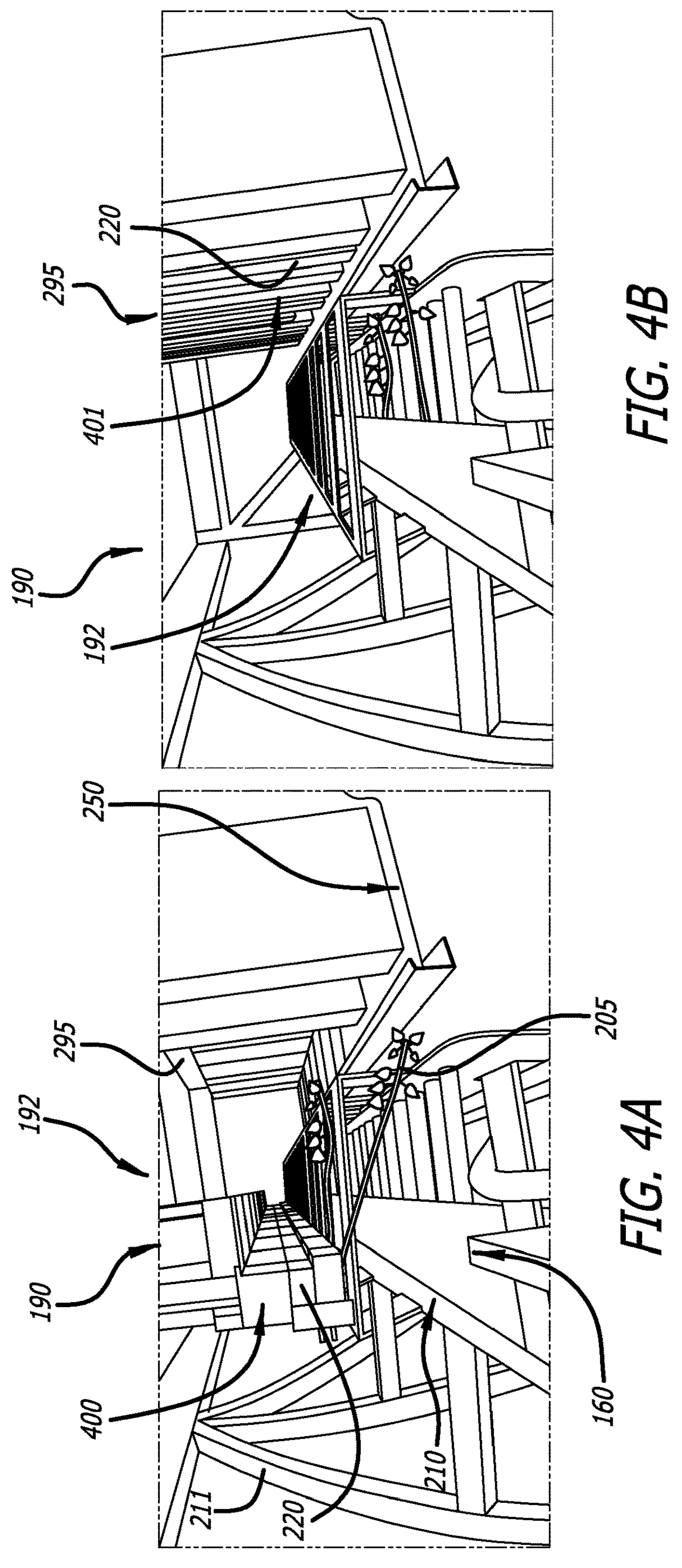
FIGS. 4A-4B illustrate a series of perspective views of an automated transplanter having a singulation unit with automated grippers, slip cartridges, and a conveyer belt with brushed slip holder assemblies, in accordance with embodiments of the present disclosure.

For example, the side rail frame 111, the floating frame 120, and any other frames of the transplanter 103 (e.g., the top body frame/chassis 211 of the singulation unit 190 depicted in FIG. 4A) may be composed of a metallic material (e.g., aluminum, titanium, or stainless steel, brass, copper, chromoly steel, iron, and/or the like), a composite material (e.g., carbon fiber), a polymeric material (e.g., plastic), and/or some combination of these materials (or any other similar materials). That is, the frames of the transplanter 103 may need to be formed with a substantially rigid material that may support stress applied at/near any of the frame's joints/nodes, and also support compression, tension, torsion, shear stresses, and/or some type of combination of these stress types.

In addition, the planter unit 110 may be configured with the sword assembly 140 comprising of, but not limited to, a furrow sword opener 141, a sword 142 (or sword disk, furrow disk, etc.), a dirt flap 144, and a sensor 146; and the open rail assembly 150 comprising of, but not limited to, an open rail sway guard/slip panel/support bracket 152 and an open rail track 155. As shown, in several embodiments, the planter unit 110 may be supported by one or more wheels 132 of the closing wheels assembly 130 and/or the sword 142 of the sword assembly 140.

Furthermore, as distinctly shown below in FIGS. 8A-8D, the transplanter 103 may use the planter unit 110 to receive the bulk stored harvested slips from a minimal operating crew (if desired), and then autonomously output a consistent planted row of evenly spaced transplanted slips (e.g., as shown with the transplanted slip 205 of FIGS. 8C-8D). In several embodiments, as discussed above, the planter unit 110 may be managed/controlled with one or more controllers, which may include, but is not limited to, the depth controller 136 in conjunction with the sensor 146. That is, the transplanter 103 may use the controller 136 (or any other controller) to actively control the planter unit 110 based on one or more operational modes such as an active depth control planting mode, an active node control planting mode, and so on.

For example, the controller 136 in conjunction with the sensor 146 may be configured to implement one or more of the operational modes to dynamically adjust planting depths, planting angles, planting node counts, and/or planting slip rates. In some embodiments, the sensor 146 may be arranged directly in front of the sword 142 and disposed between the dirt flap 144 and the sword 142. As such, this configuration may facilitate the active depth control planting mode for the transplanter 103, which may then be used to dynamically adjust the planting depth of the planter unit 110 in real-time, such that the sword 142, the furrow sword opener 141, and/or the closing wheels 132 may be dynamically adjusted higher and/or lower into the soil with respect to the z-axis.

For example, the sensor 146 may be configured to provide a signal to the controller 136 based on at least an angle of rotation in relation to the ground and the planter unit 110. In another example, the controller 136 may be configured to implement the active depth control planning mode to dynamically adjust the planting depth based on one or more planting measurements (or data points) collected by the sensor 146. Furthermore, the controller 136 may be configured to actively adjust a depth of operation of the planter unit 110 based on any of the planting measurements collected by the sensor 146, where the depth of operation may include adjusting all (or most) of the mechanisms of the planter unit 110 in order to achieve a newly desired planting depth/angle.

In some embodiments, the sensor 146 may include, but is not limited to, a depth sensor, a motion sensor, a photoelectric sensor, an optical encoder, a rotary sensor, a linear potentiometer sensor, and/or any other similar depth sensing device. Furthermore, as described above, the sensor 146 may be configured to measure one or more soil properties and collect one or more planting measurements in real-time as the planter unit 110 traverses the ground/field. For example, the sensor 146 may be configured to collect the measurement data with regard to the soil properties and/or the collected planting measurements, where the collected planting measurements may further include, but are not limited to, soil reflectance measurements, predetermined planting properties of the transplanted slips, and/or variable depth measurements between the ground and the planter unit 110 (or between the ground and any components of the transplanter 103).

Additionally, as shown in FIG. 1, the transplanter 103 may include the node sensor 192 that may be associated with one or more of the planter unit 110, the singulation unit 190, and the conveyor belt 160. In most embodiments, the node sensor 192 may be configured to autonomously monitor the singulated slips as they are transferred throughout the transplanter 103, and also to collect performance data of the singulated slips in real-time. Furthermore, in many embodiments, the node sensor 192 may be communicatively coupled to a controller (e.g., the controller 136 and/or any other controllers described herein), where the controller may be configured to implement one of the operational modes (e.g., the active node control planting mode) and to dynamically adjust a planting slip rate based on the implemented operational mode and the performance data collected by the node sensor 192. Note that the node sensor 192 is described in greater detail below.

Referring now to FIGS. 2A-2O, 3A-3D, 4A-4B, 5-7, and 8A-8D depicted below, one or more implementations of the automated slip transplanter 103 are shown in accordance with embodiments of the disclosure. Accordingly, various examples of the automated slip transplanter 103 are illustrated below with regard to the embodiments depicted above in FIG. 1. As such, although FIGS. 2A-2O, 3A-3D, 4A-4B, 5-7, and 8A-8D depict one or more specific views, illustrations, and/or configurations of the various components and subassemblies of the automated slip transplanter 103, it should be appreciated that any of the illustrated configurations of the respective Figures depicted below may comprise more/less mechanisms, one or more mechanisms positioned in different locations, and one or more mechanisms assembled with different techniques, without limitations.

Figure 2A:
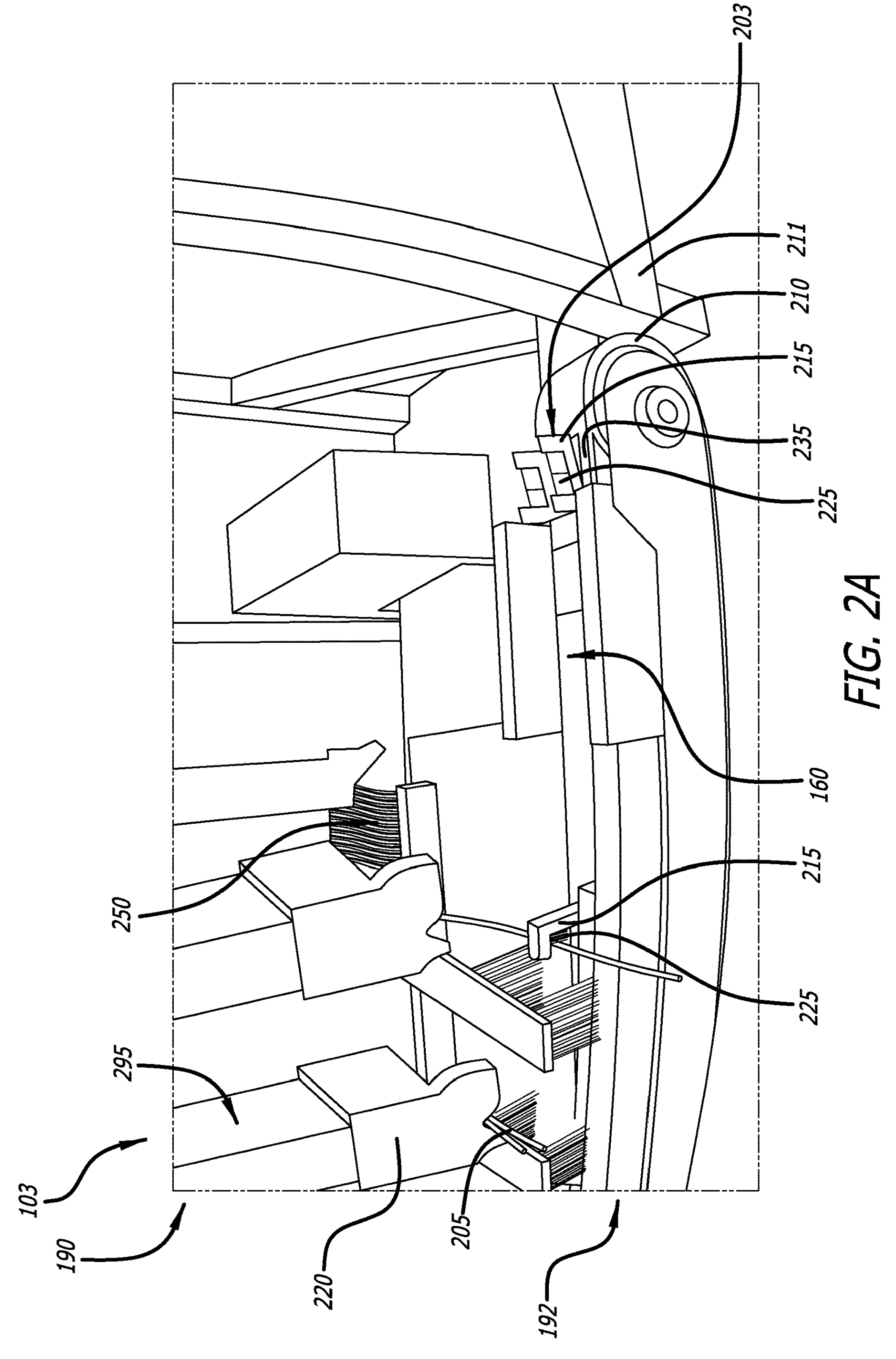
FIGS. 2A-2O illustrate a series of views of a brushed slip holder assembly and operational mechanisms, in accordance with embodiments of the present disclosure.
Figure 2B:
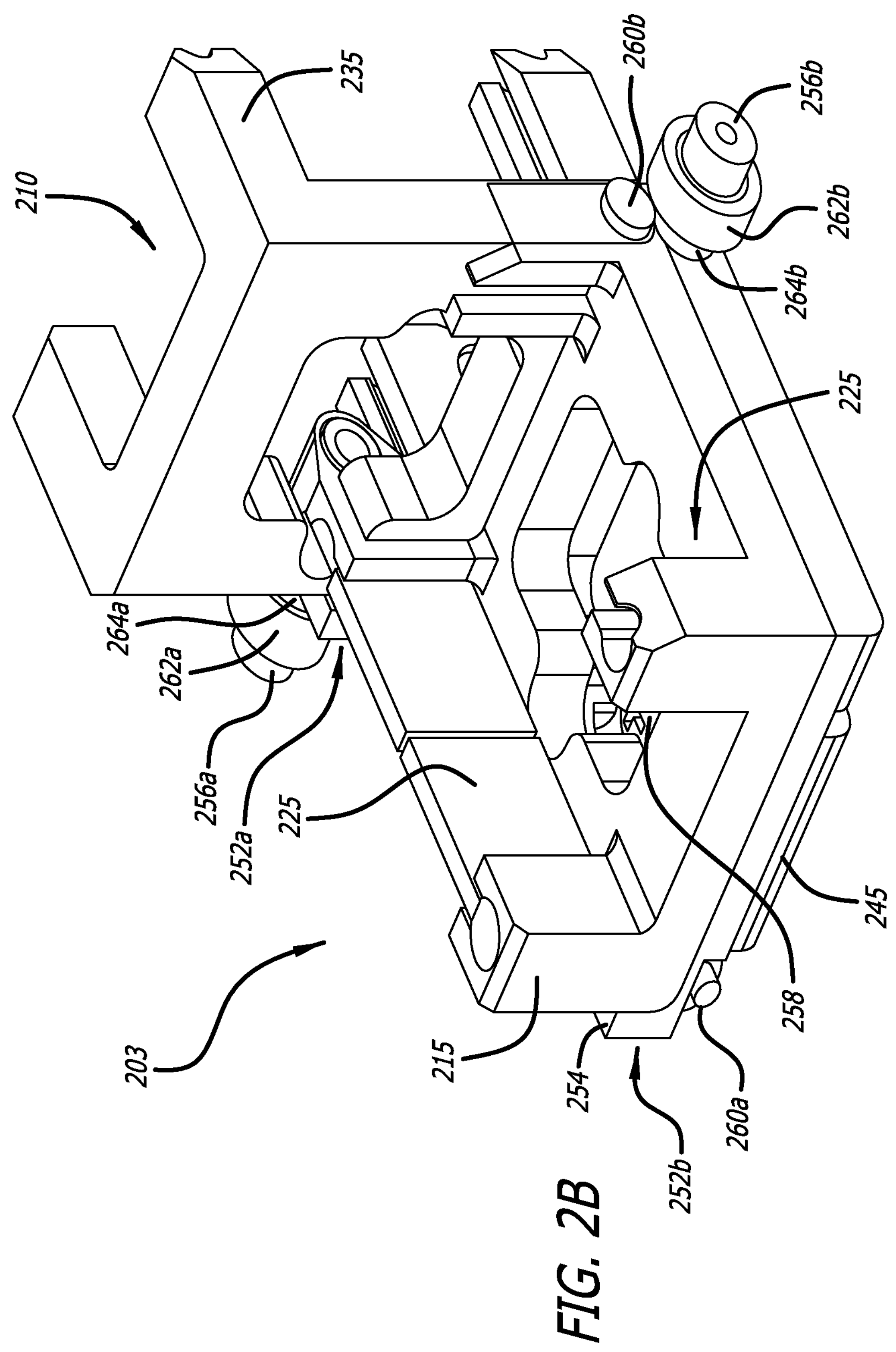
Figures 2C, 2D:
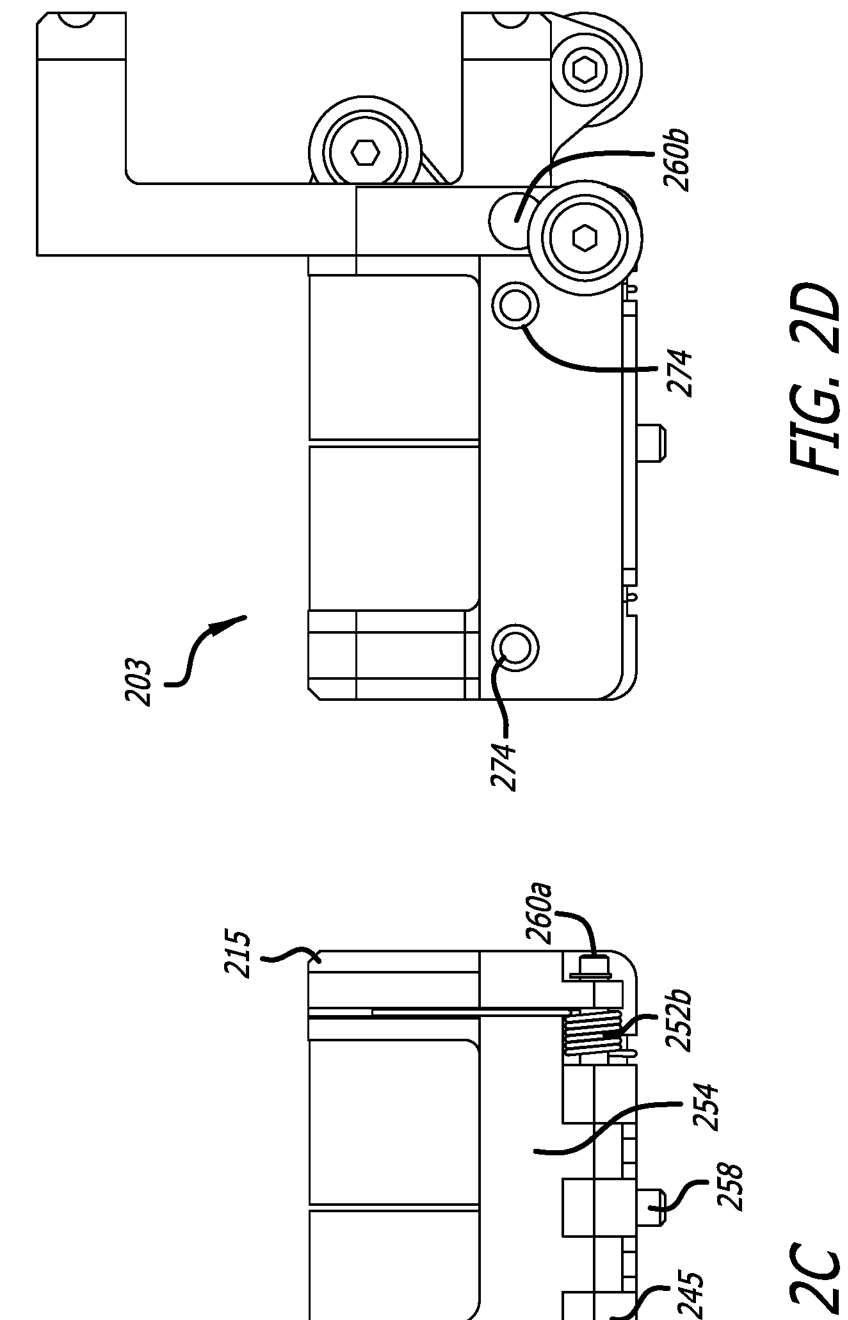
Figure 2F:
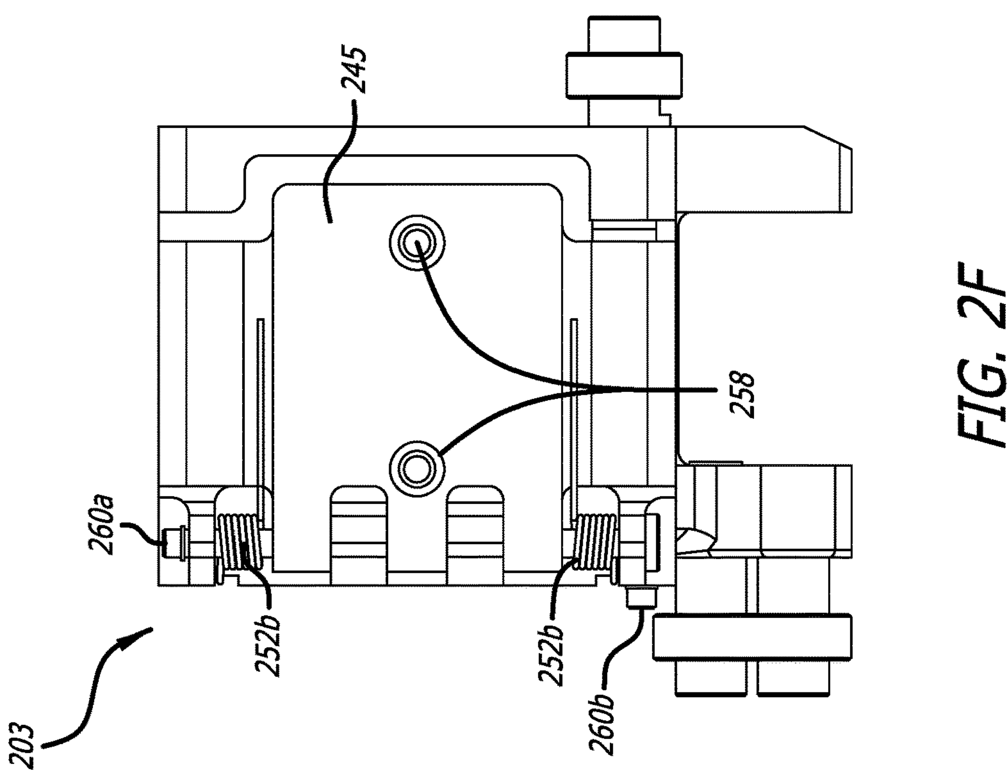
Figure 2E:
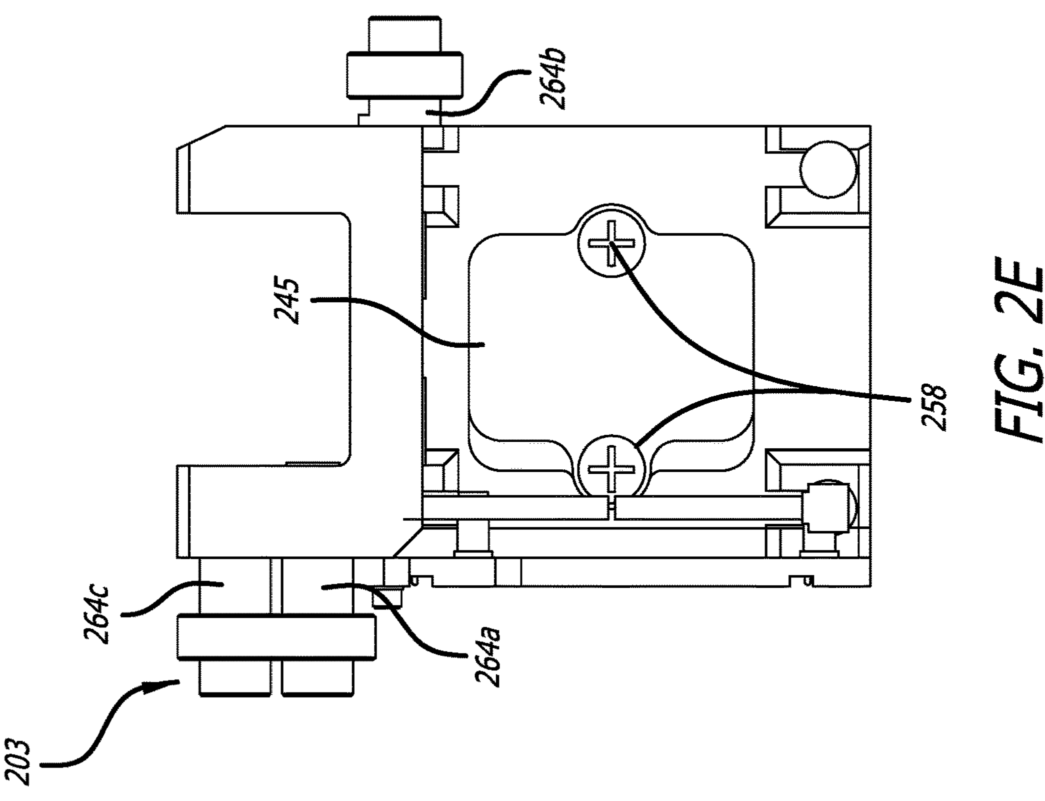
Figure 2H:
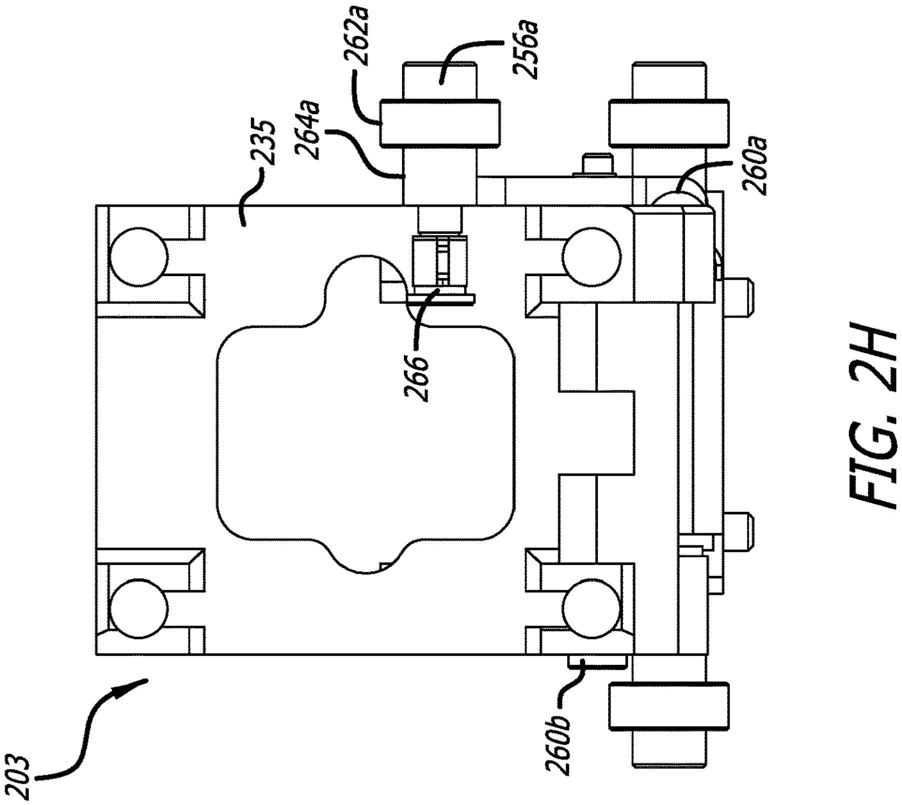
Figure 2G:
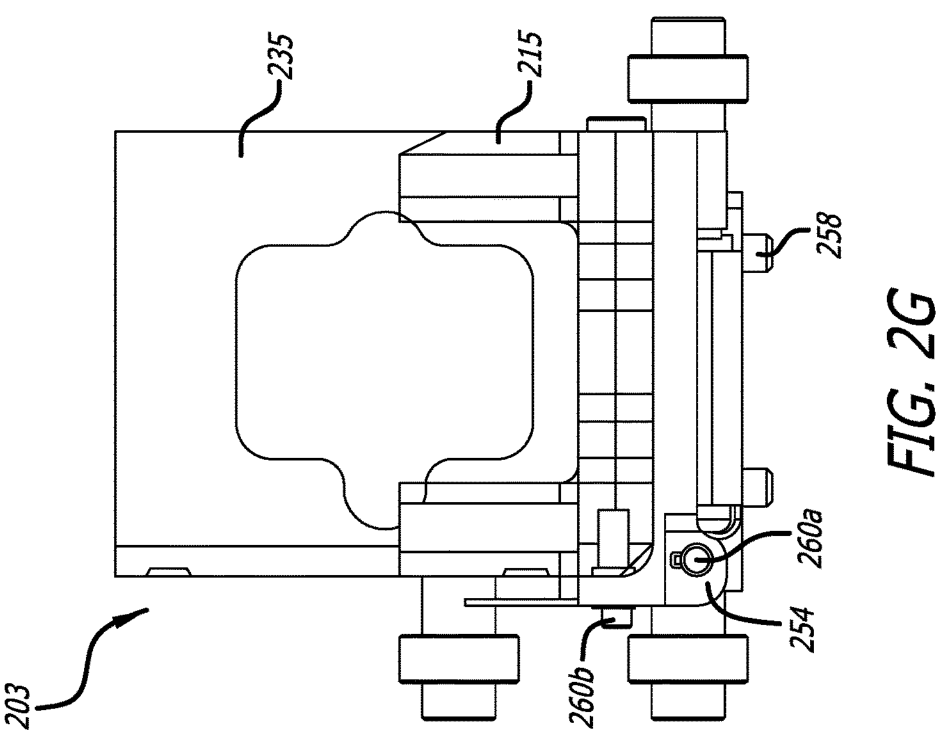
Figure 2I:
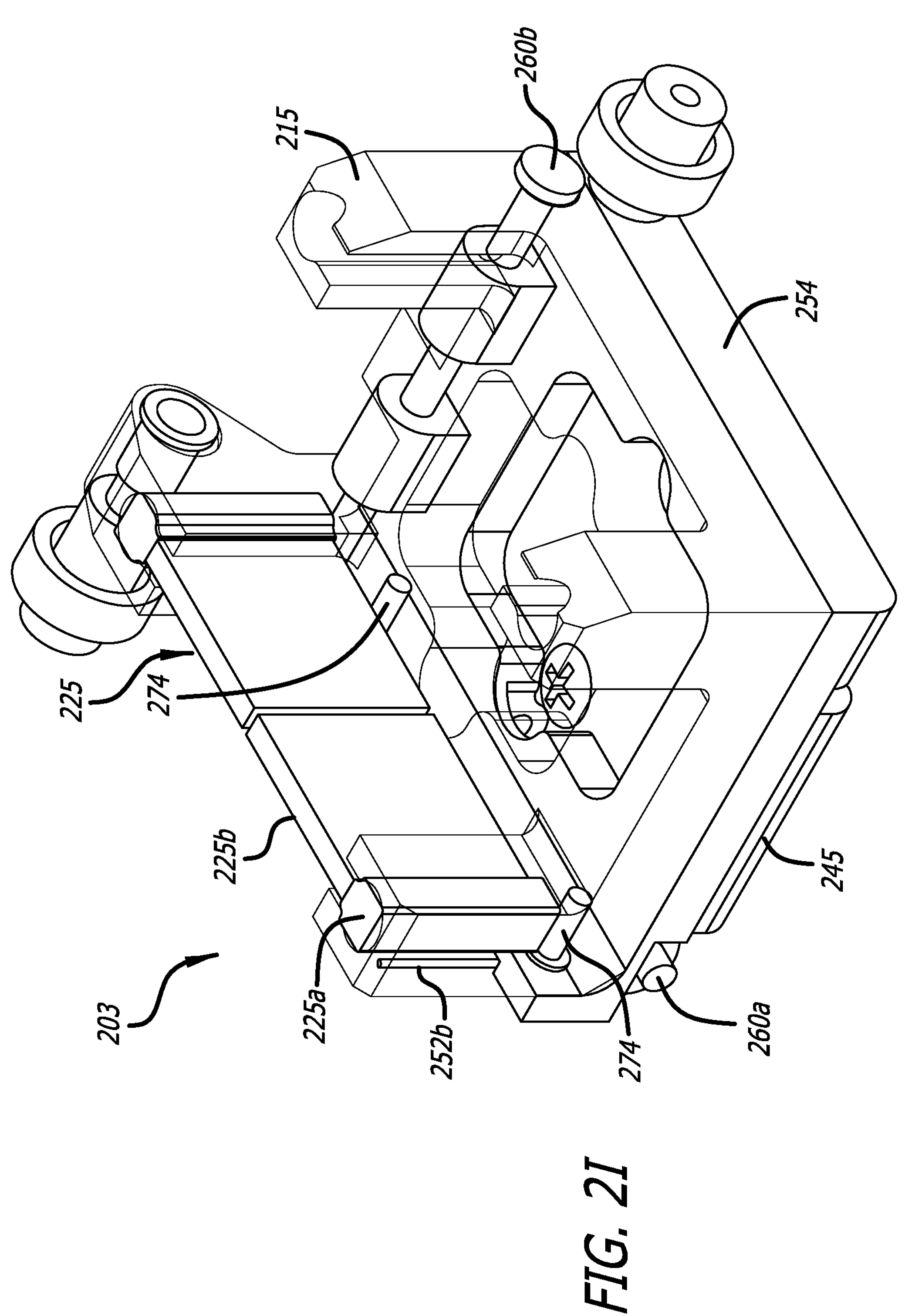
Figures 2J, 2K:
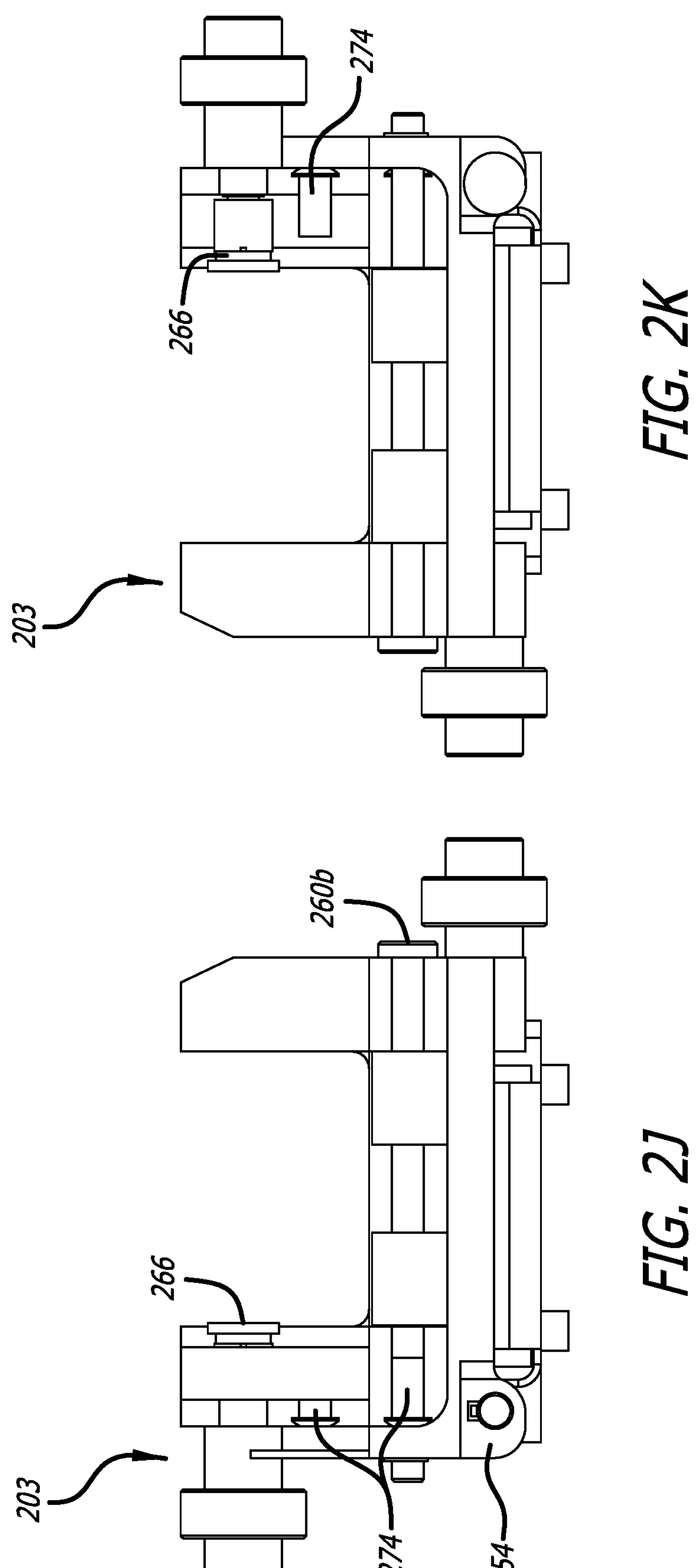
Figure 2M:
Figure 2M:
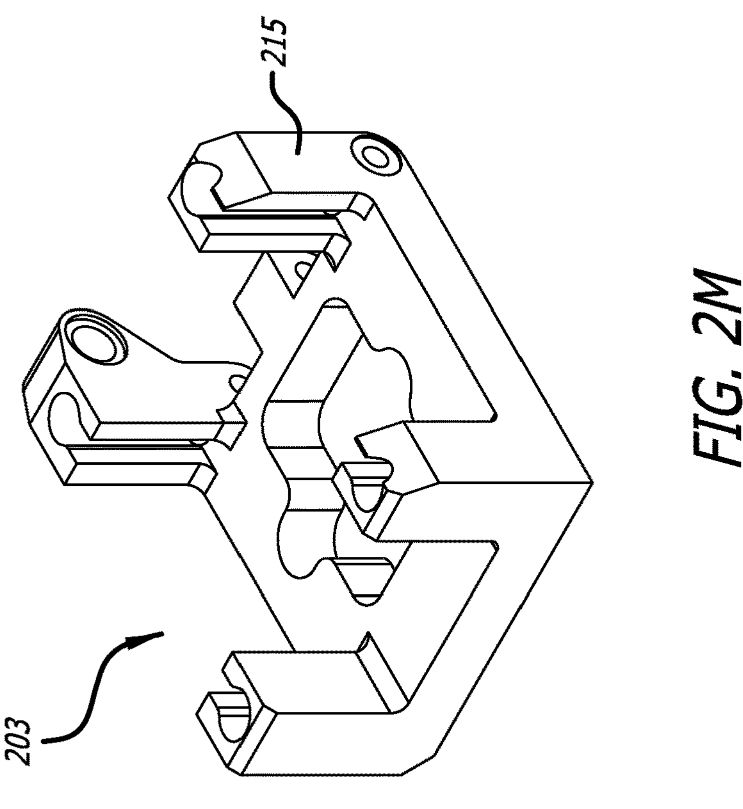
Figure 2L:
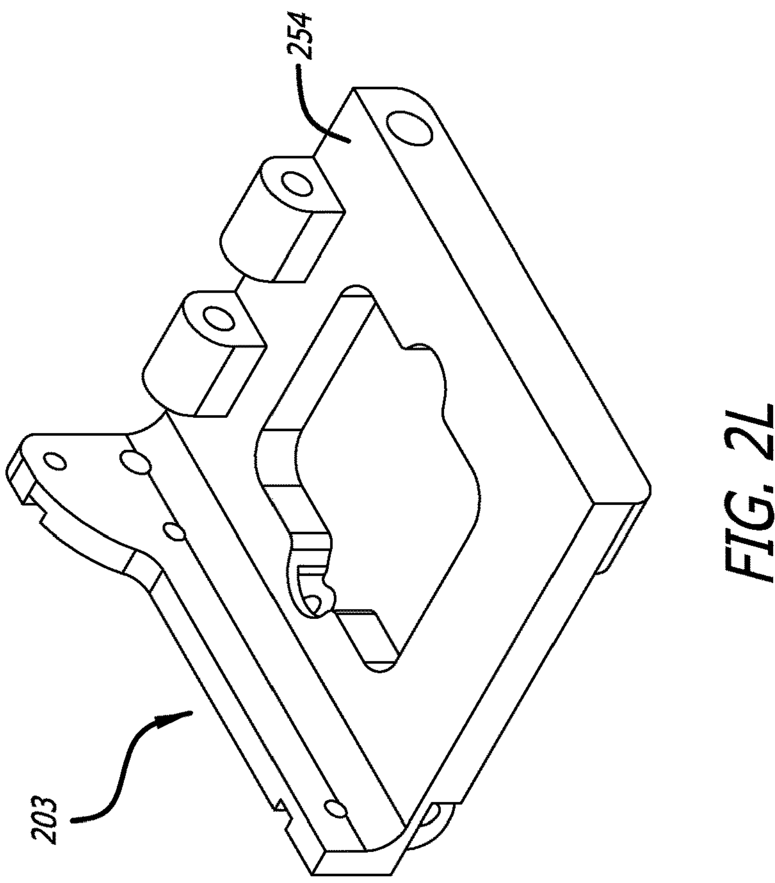
Figure 2O:
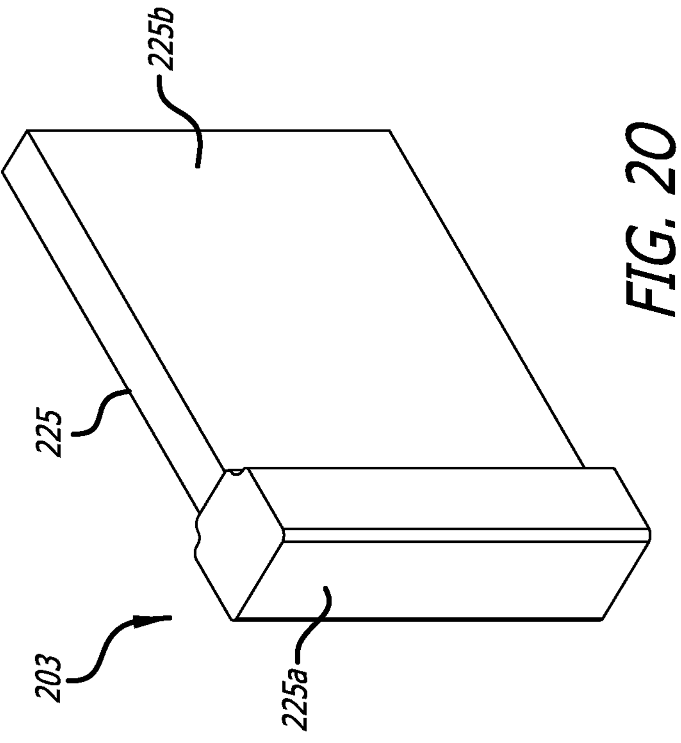
Figure 2N:
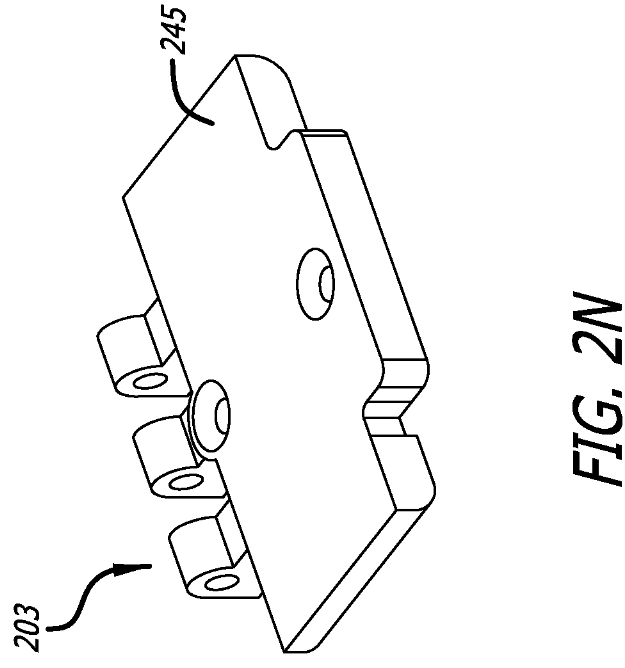
Figure 3A:
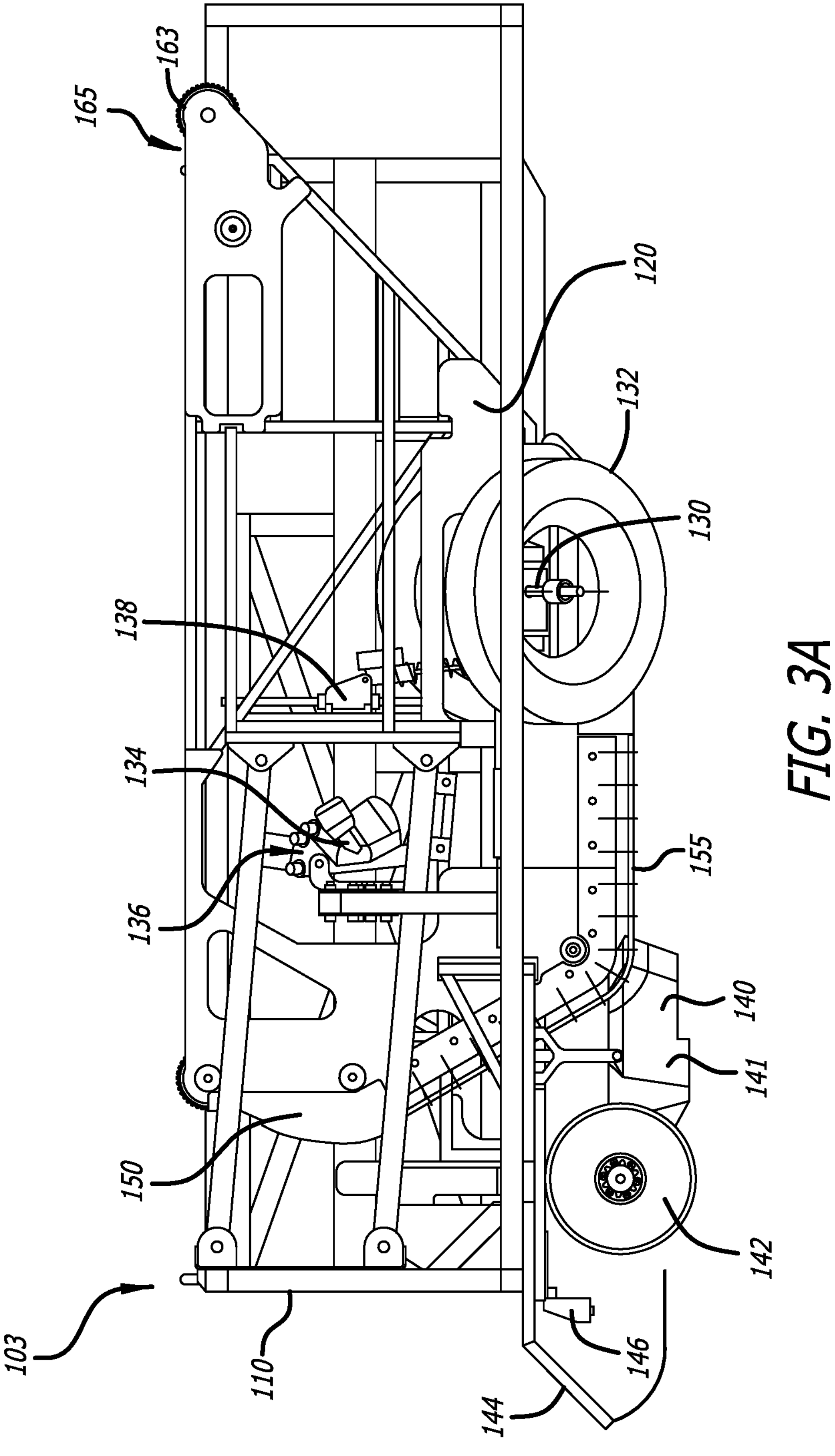
FIGS. 3A-3D illustrate a series of isometric views of an automated transplanter, in accordance with embodiments of the present disclosure.
Figures 3B, 3C:
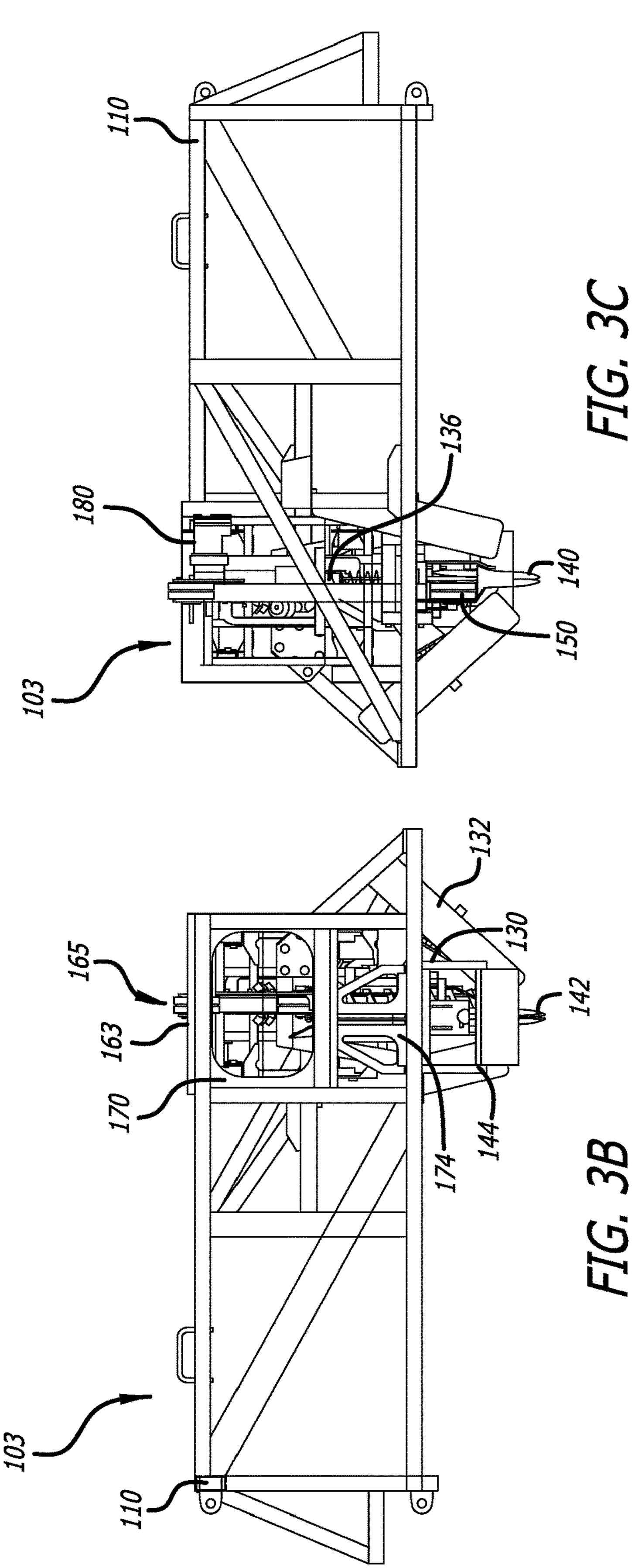
Figure 3D:
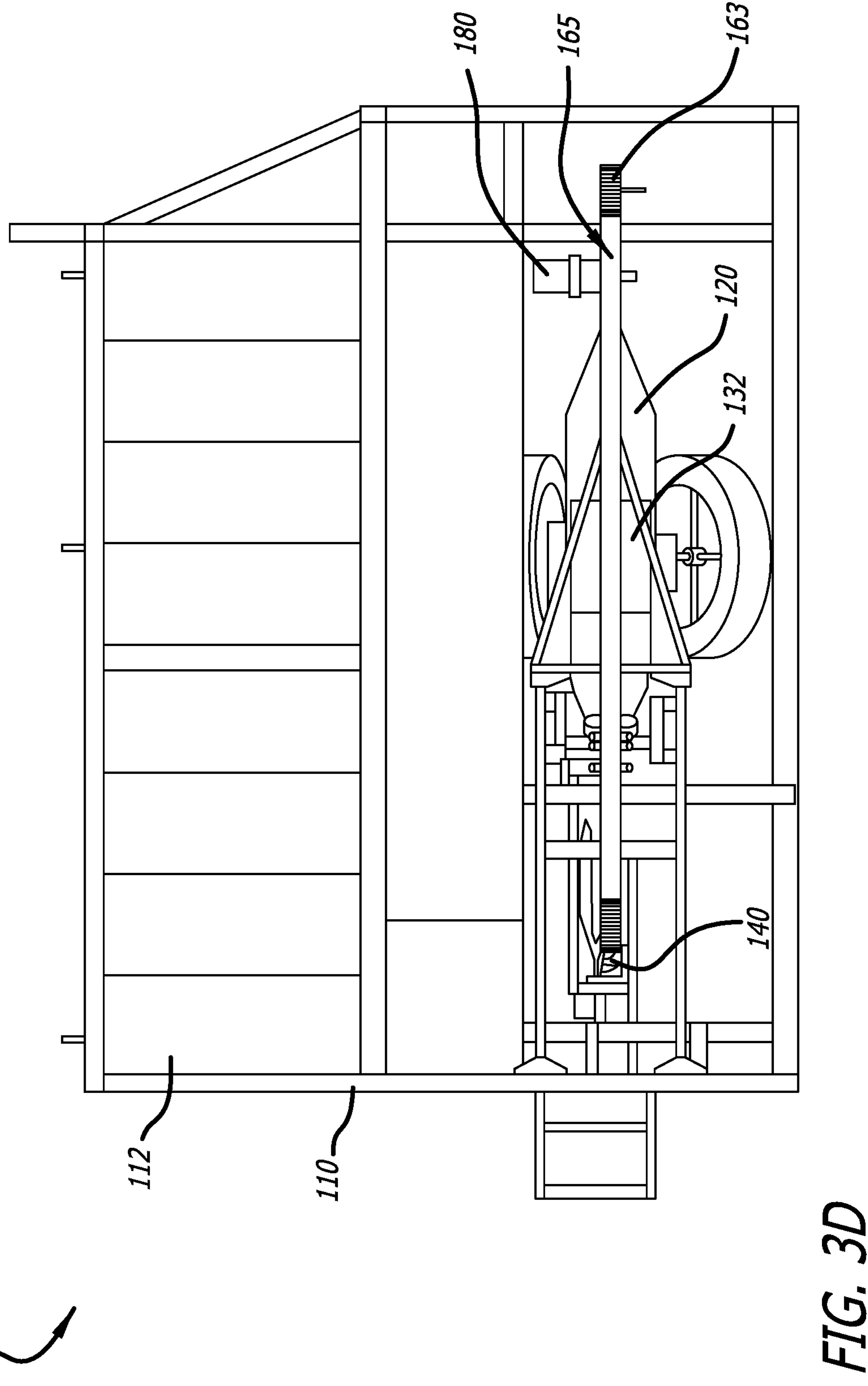

Referring now to FIGS. 2A-2O, a series of exemplary and perspective view illustrations of one or more brushed slip holder assemblies 203 of the singulation unit 190 of the transplanter 103 are shown, in accordance with embodiments of the disclosure. It should be understood that the singulation unit 190 of the transplanter 103 depicted in FIG. 2A may be substantially similar to the singulation unit 190 of the transplanter 103 depicted above in FIG. 1. For example, any of the mechanisms and assemblies of the transplanter 103, such as the mechanisms and assemblies of the brushed slip holder assemblies 203 of the singulation unit 190 (and/or any other units and mechanisms implemented with the brushed slip holder assemblies 203) depicted in FIGS. 2A-2O may be similar to one or more of the mechanisms and assemblies of the transplanter 103 depicted in FIGS. 1, 3A-3D, 4A-4B, 5-7, and 8A-8D. As such, any of the brushed slip holder assemblies 203 depicted in FIG. 2A may be the same and/or similar to the brushed slip holder assembly 203 depicted in FIGS. 2B-2O, with the exception that one or more of the FIGS. 2A-2O may depict the brushed slip holder assembly 203 and its one or more operational mechanism from one or more different viewing illustrations, and may also include one or more mechanisms not previously shown for clarity purposes.

Referring now to FIG. 2A, the singulation unit 190 may include, but is not limited to, a plurality of brushed slip holder assemblies 203, a plurality of slips 205, a continuous belt 210, a top body frame/chassis 211, a plurality of automated grippers 220 (or claws, robotic arms, gantry assemblies, etc.), a controller 295, and a plurality of slip cartridges 250 that are used to store the slips 205. In many embodiments, the illustrated singulation unit 190 may be similar to the singulation unit 190 illustrated above in FIG. 1, with the exception that the plurality of the brushed slip holder assemblies 203 hinged to the conveyor belt 160 may be better depicted in FIG. 2A, and that the individual components/mechanisms of one of the brushed slip holder assemblies 203 may be best depicted in greater detail in the respective FIGS. 2B-2O. For example, as shown in FIG. 2A, the conveyor belt 160 may include the continuous belt 210 coupled (or hinged) to each of the brushed slip holder assemblies 203, where each of the brushed slip holder assemblies 203 may receive (or collect/singulate) one of the slips 205 and then consistently transfer the singulated slips 205 towards the planter unit 110. Furthermore, in most embodiments, each brushed slip holder assembly 203 may include, but is not limited to, a slip bristle holder 215 (or a bristle holder hinged), a plurality of bristle sections 225, a belt slip holder 235, a belt holder base 245, and an intermediate double-sided hinge 254, where each of these components/mechanisms are coupled together (as clearly shown below in FIG. 2B) and are operably coupled to the belt 210 of the conveyor belt 160.

Furthermore, as illustrated in FIG. 2A, the node sensor 192 may be associated with the singulation unit 190, the conveyor belt 160, and the planter unit 110. In several embodiments, a controller (e.g., the controller 295, the controller 136 of FIG. 1, and/or the like) may be configured to actively control at least one or more of the planter unit 110, the singulation unit 190, and the conveyor belt 160 in order to dynamically adjust the planting slip rate (as discussed above in FIG. 1). In several embodiments, the controller may be configured to actively control and dynamically adjust the planting slip rate to maintain a predetermined overall planting slip rate. That is, the controller may be configured to actively control the transplanter 103 to dynamically increase or decrease the planting slip rate in order to maintain the predetermined overall planting slip rate. In some embodiments, the controller may be configured to actively target a predetermined number of nodes per slip based on the predetermined overall planting slip rate and the performance data collected by the node sensor 192.

In most embodiments, the node sensor 192 may collect any desired number of performance data points, including, but not limited to, a node count, a singulation rate, a population value, a number of skipped slips, a number of multiple slips, a slip spacing rate (e.g., the spacing between planted slips), and a belt speed. Additionally, in several embodiments, the singulation unit 190 may further comprise a buffer system (e.g., as shown below with the buffer system 500 in FIG. 5), where the buffer system may be configured to implement slip rejection and buffering input operations to thereby facilitate the overall predetermined planting slip rate. According to most embodiments, the node sensor 192 may be a neural network and/or the like. However, in other embodiments, the node sensor 192 may be any type of monitoring and measuring device capable of implementing planting slip-rate prediction neural network processes and/or the like.

Referring now to FIG. 2B, an exemplary and perspective view illustration of an individual brushed slip holder assembly 203 is shown, in accordance with one or more embodiments of the disclosure. For example, as described above, the individual brushed slip holder assembly 203 may be implemented with the slip bristle holder 215, the bristle sections 225, and the belt slip holder 235 that are coupled together by the belt holder base 245 and the intermediate double-sided hinge 254. Furthermore, in most embodiments, the individual brushed slip holder assembly 203 may also include, but is not limited to, torsion springs 252*a-b*, shoulder screws 256*a-b*, screws 258, ball bearing rings 262*a-b*, spacers 264*a-b*, and hinge pins 260*a-b*.

Referring now to FIGS. 2C-2H, a series of different view illustrations of the individual brushed slip holder assembly 203 is shown, in accordance with one or more embodiments of the disclosure. It should be understood that the brushed slip holder assembly 203 depicted in each of the respective FIGS. 2C-2H is substantially similar to the brushed slip holder assembly 203 depicted above in FIGS. 2A-2B, with the exceptions that one or more of the FIGS. 2C-2H may depict the brushed slip holder assembly 203 and its one or more operational mechanism from one or more different viewing illustrations, and may also include one or more mechanisms not previously shown for clarity purposes. For example, as shown in FIG. 2C, the brushed slip holder assembly 203 may also include, but is not limited to, a shoulder screw 256*c*, a ball bearing ring 262*c*, and a spacer 264*c* that are substantially similar to the shoulder screws 256*a-b*, the ball bearing rings 262*a-b*, and the spacers 264*a-b* shown above in FIG. 2B.

Similarly, as shown in FIG. 2D, the brushed slip holder assembly 203 may also include, but is not limited to, one or more spring plungers 274 used to couple (or hinge) the slip bristle holder 215 to the intermediate double-sided hinge 254. For example, in some embodiments, the spring plungers 274 may be press-fit ball-nose spring plungers and/or the like. Furthermore, as shown in FIG. 2H, the brushed slip holder assembly 203 may also include, but is not limited to, flanged screw inserts 266 that are coupled to the respective ends of the shoulder screws 256*a-c*.

Referring now to FIG. 2I, an exemplary and perspective view illustration of the individual brushed slip holder assembly 203 with the slip bristle holder 215, the belt holder base 245, and the intermediate double-sided hinge 254 is shown, in accordance with one or more embodiments of the disclosure. Moreover, it should be understood that the brushed slip holder assembly 203 depicted in FIG. 2I is substantially similar to the brushed slip holder assembly 203 depicted above in FIGS. 2A-2H, with the exception that FIG. 2I omits the belt slip holder 235 for clarity purposes. For example, as shown in FIG. 2I, each of the bristle sections 225 may be implemented with The brushed slip holder assembly of claim 5, where each of the bristle sections is operably coupled to one of the plurality of first legs of the slip bristle holder.

Referring now to FIGS. 2J-2K, a series of different view illustrations of the individual brushed slip holder assembly 203 is shown, in accordance with one or more embodiments of the disclosure. It should be understood that the brushed slip holder assembly 203 depicted in the respective FIGS. 2J-2K is substantially similar to the brushed slip holder assembly 203 depicted above in FIG. 2I (as well as in FIGS. 2A-2H), with the exceptions that FIGS. 2J-2K may depict the brushed slip holder assembly 203 and its one or more operational mechanism from one or more different viewing illustrations, and may also include one or more mechanisms not previously shown for clarity purposes.

Similarly, referring now to FIGS. 2L-2O, a series of perspective view illustrations of one or more individual mechanisms/components of the brushed slip holder assembly 203 is shown, in accordance with one or more embodiments of the disclosure. For example, the intermediate double-sided hinged 254 is individually shown in FIG. 2L; the slip bristle holder 215 is individually shown in FIG. 2M; the belt holder base 245 is individually shown in FIG. 2N; and the bristle section 225 is individually shown in FIG. 2O, where each of the bristle sections 225 has a head section 225*a* and a body section 225*b*.

Referring now to FIGS. 3A-3D, a series of isometric view illustrations of the planter unit 110 of the transplanter 103 are shown, in accordance with embodiments of the disclosure. It should be understood that the planter unit 110 of the transplanter 103 depicted in FIGS. 3A-3D may be substantially similar to the planter unit 110 of the transplanter 103 depicted above in FIG. 1. As such, any of the mechanisms and assemblies of the planter unit 110 depicted in FIGS. 3A-3D may be substantially similar to the respective mechanisms and assemblies of the planter unit 110 depicted in FIG. 1. Also, the planter unit 110 of the transplanter 103 depicted in FIG. 3A may be the same throughout the following FIGS. 3B-3D, with the exception that each of the FIGS. 3A-3D shows the planter unit 110 from a different viewing illustration.

Referring now to FIGS. 4A-4B, a series of exemplary screenshot illustrations of the singulation unit 190 of the transplanter 103 having the brushed slip holder assemblies 203 is shown, in accordance with embodiments of the disclosure. It should be understood that both the singulation unit 190 and/or the brushed slip holder assemblies 203 depicted in FIGS. 4A-4B may be substantially similar to the singulation unit 190 and/or the brushed slip holder assemblies 203 depicted and discussed above in FIGS. 1 and 2A-2O. As such, any of the mechanisms and assemblies of the singulation unit 190 and/or any other units and mechanisms of the transplanter 103 depicted in FIGS. 4A-4B may be similar to the respective mechanisms and assemblies of the transplanter 103 depicted in FIGS. 1 and 2A. Furthermore, the singulation unit 190 of the transplanter 103 depicted in FIG. 4A may be the same as shown in FIG. 4B, with the exception that each of the FIGS. 4A-4B may show the singulation unit 190 from a different viewing illustration and may also include one or more mechanisms not previously shown for clarity purposes.

For example, as shown in FIGS. 4A-4B, the singulation unit 190 may include, but is not limited to, a controller 295, a top body frame/chassis 211, a plurality of automated grippers 220 (or robotic arms, gantry assembly, etc.), and a plurality of slip cartridges 250 that are used to store the slips 205. As discussed above, when the singulation unit 190 is activated or in an "ON" mode (depicted with arrow "400"), the singulation unit 190 may implement the automated grippers 220 to singularly grasp the slips 205 from the slip cartridges 250 and then discharge (or release) the singulated slips 205 to the conveyor belt 160. Meanwhile, as shown in FIG. 4B, when the singulation unit 190 is idle or in an "OFF" mode (depicted with arrow "401"), the singulation unit 190 may retract the automated grippers 220 back to its starting position above the slip cartridges 250.

Figure 5:
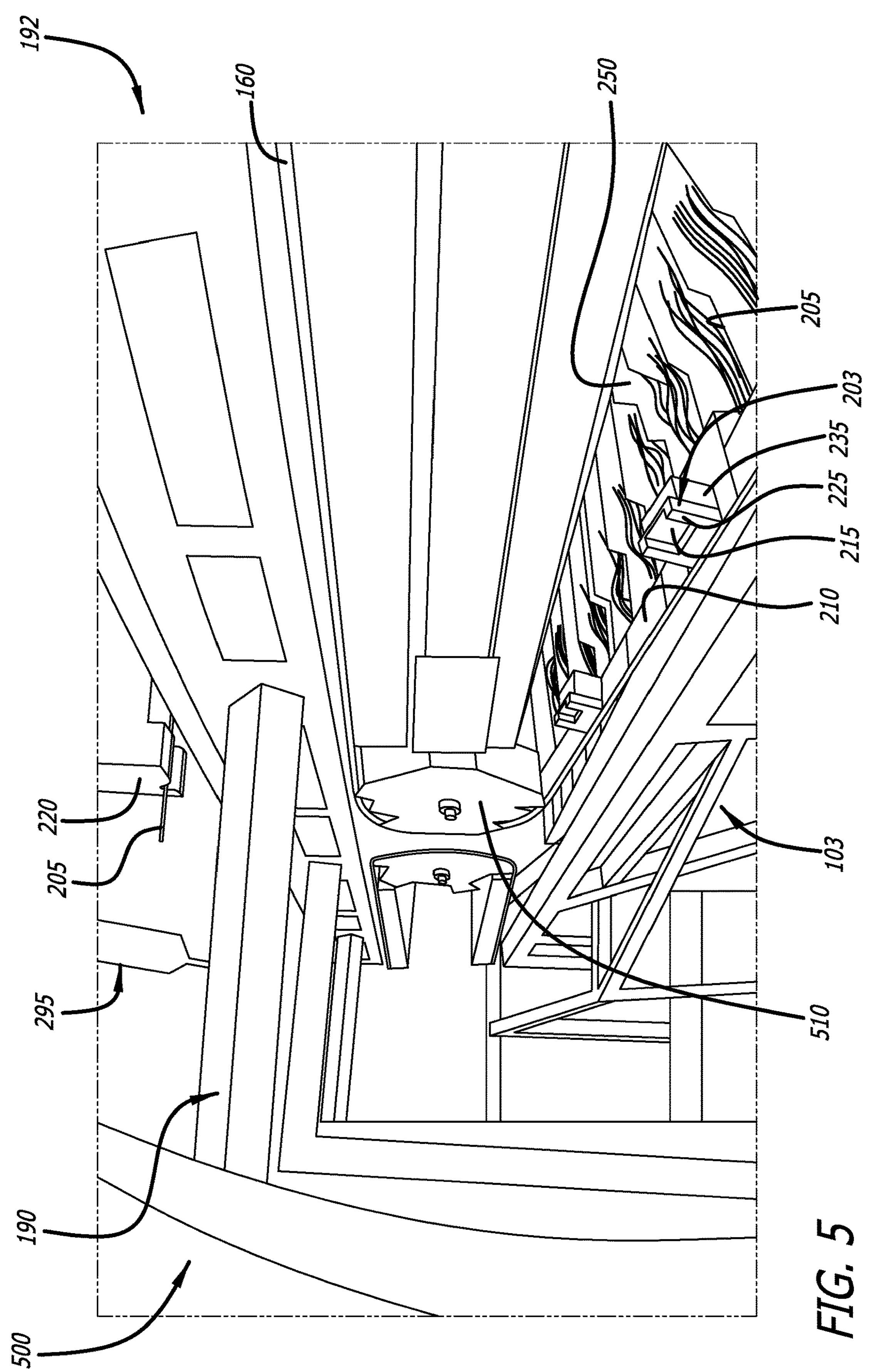
FIG. 5 illustrates a perspective view of a buffer assembly of an automated transplanter having a plurality of brushed slip holder assemblies and operational mechanisms, in accordance with an embodiment of the present disclosure.

Referring now to FIG. 5, an exemplary screenshot illustration of a buffer system 500 of the singulation unit 190 of the transplanter 103 is shown, in accordance with embodiments of the disclosure. It should be understood that the singulation unit 190 of the transplanter 103 depicted in FIG. 5 may be substantially similar to the singulation unit 190 of the transplanter 103 depicted and discussed above in FIGS. 1 and 4A-4B. For example, any of the mechanisms and assemblies of the singulation unit 190 and/or any other units and mechanisms of the transplanter 103 depicted in FIG. 5 may be similar to the respective mechanisms and assemblies of the singulation unit 190 of the transplanter 103 depicted in FIGS. 4A-4B. As such, the conveyor belt 160, the singulation unit 190, and the brushed holder assembly 203 depicted in FIG. 5 may be the same as the conveyor belt 160, the singulation unit 190, and the brushed holder assembly 203 depicted in FIGS. 4A-4B, with the exception that FIG. 5 further illustrates the rail and turning wheel 510 implemented for the conveyor belt 160 and the singulation unit 190, as well as the buffer system 500 that helps to mitigate slip rejection and improve plant yield.

Figure 6:
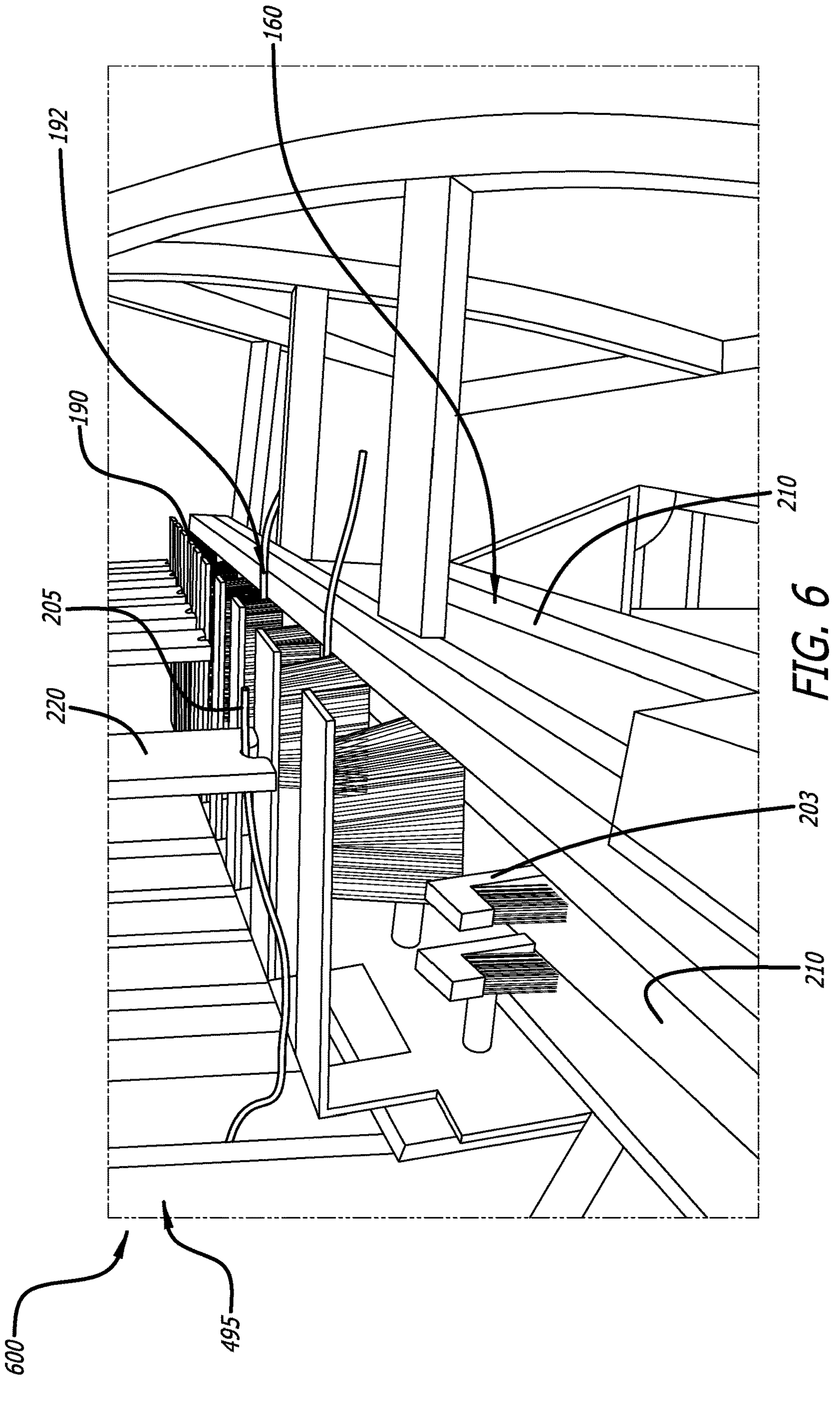
FIG. 6 illustrates a perspective view of an upper belt assembly of an automated transplanter having a plurality of brushed slip holder assemblies and operational mechanisms, in accordance with an embodiment of the present disclosure.

Referring now to FIG. 6, an exemplary screenshot illustration of an upper belt assembly 600 of the singulation unit 190 of the transplanter 103 is shown, in accordance with embodiments of the disclosure. It should be understood that the singulation unit 190 of the transplanter 103 depicted in FIG. 6 may be substantially similar to the singulation unit 190 of the transplanter 103 depicted and discussed above in FIGS. 1, 4A-4B, and 5. For example, any of the mechanisms and assemblies of the singulation unit 190 and/or any other units and mechanisms of the transplanter 103 depicted in FIG. 6 may be similar to the respective mechanisms and assemblies of the singulation unit 190 of the transplanter 103 depicted in FIGS. 4A-4B and 5. As such, the conveyor belt 160, the belt 210, the singulation unit 190, the brushed holder assembly 203, and the controller 295 depicted in FIG. 5 may be the same as the conveyor belt 160, the belt 210, the singulation unit 190, the brushed holder assembly 203, and the controller 295 depicted in FIGS. 1, 4A-4B, and 5, with the exception that FIG. 6 may provide a different viewing illustration.

Figure 7:
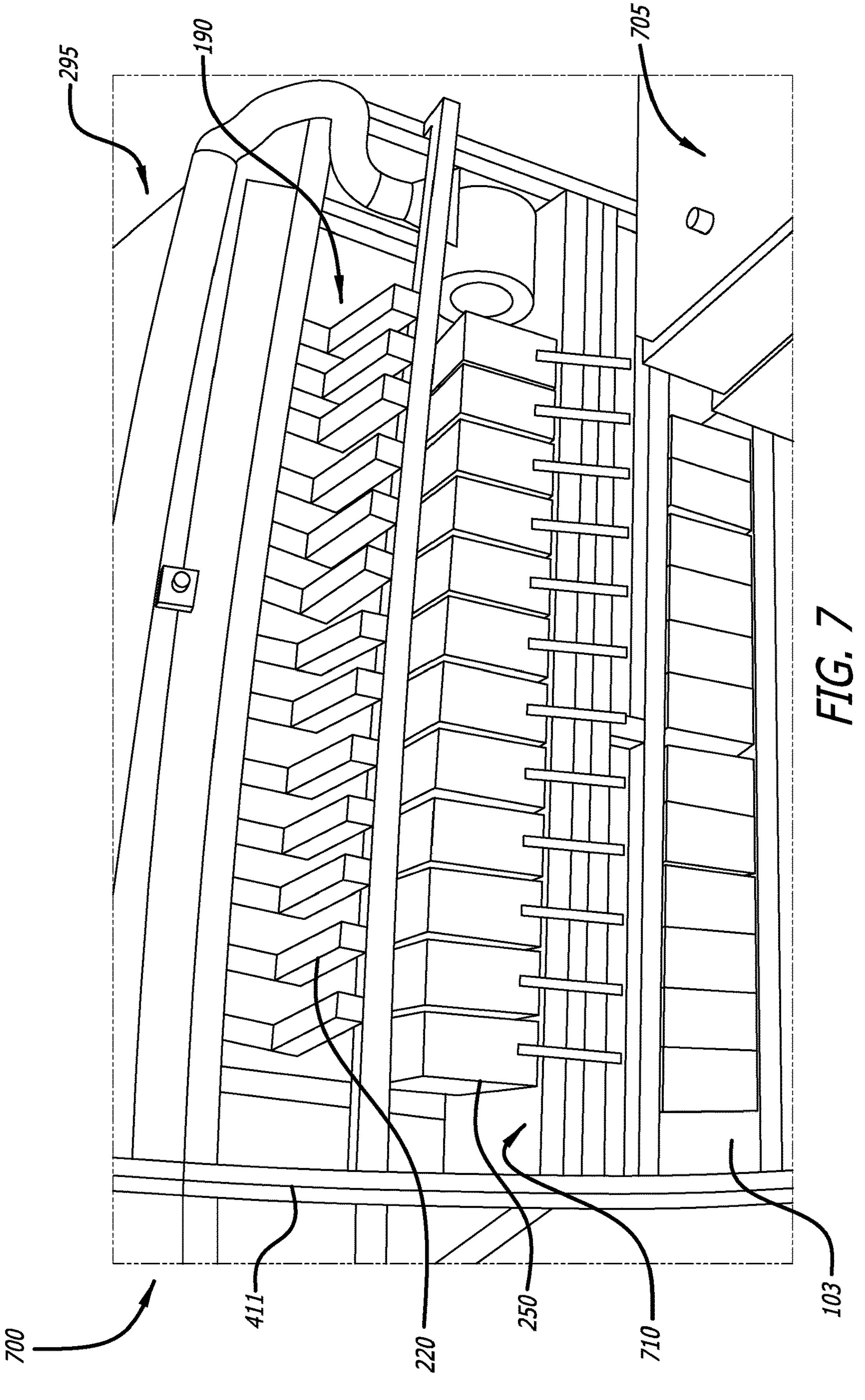
FIG. 7 illustrates a perspective view of an automated transplanter having a chassis disposed with one or more slip cartridges, automated claws, and slips, in accordance with an embodiment of the present disclosure.

Referring now to FIG. 7, an exemplary screenshot illustration of a main body frame 700 of the transplanter 103 is shown, in accordance with embodiments of the disclosure. It should be understood that the transplanter 103 depicted in FIG. 7 may be substantially similar to the transplanter 103 depicted in FIGS. 1, 3A-3D, 4A-4B, and 5-6. As such, the main body frame 700 of the transplanter 103 depicted in FIG. 7 may be similar to the bottom body frame 111 and the chassis 211 depicted in FIGS. 1 and 4A, with the exception that the backside of the slip cartridges 250 are shown and disposed (or located) on one or more stacked slip racks 710 (or shelves, platforms, etc.) of the main body frame 700, and that a controller 705 (or main controller box) is shown and may be configured to further control, manage, and power the transplanter 103. Also, it should be understood that any other controls, gauges, lines, actuators, and indicators may be incorporated into the controller 705, without limitations.

Figure 8A:
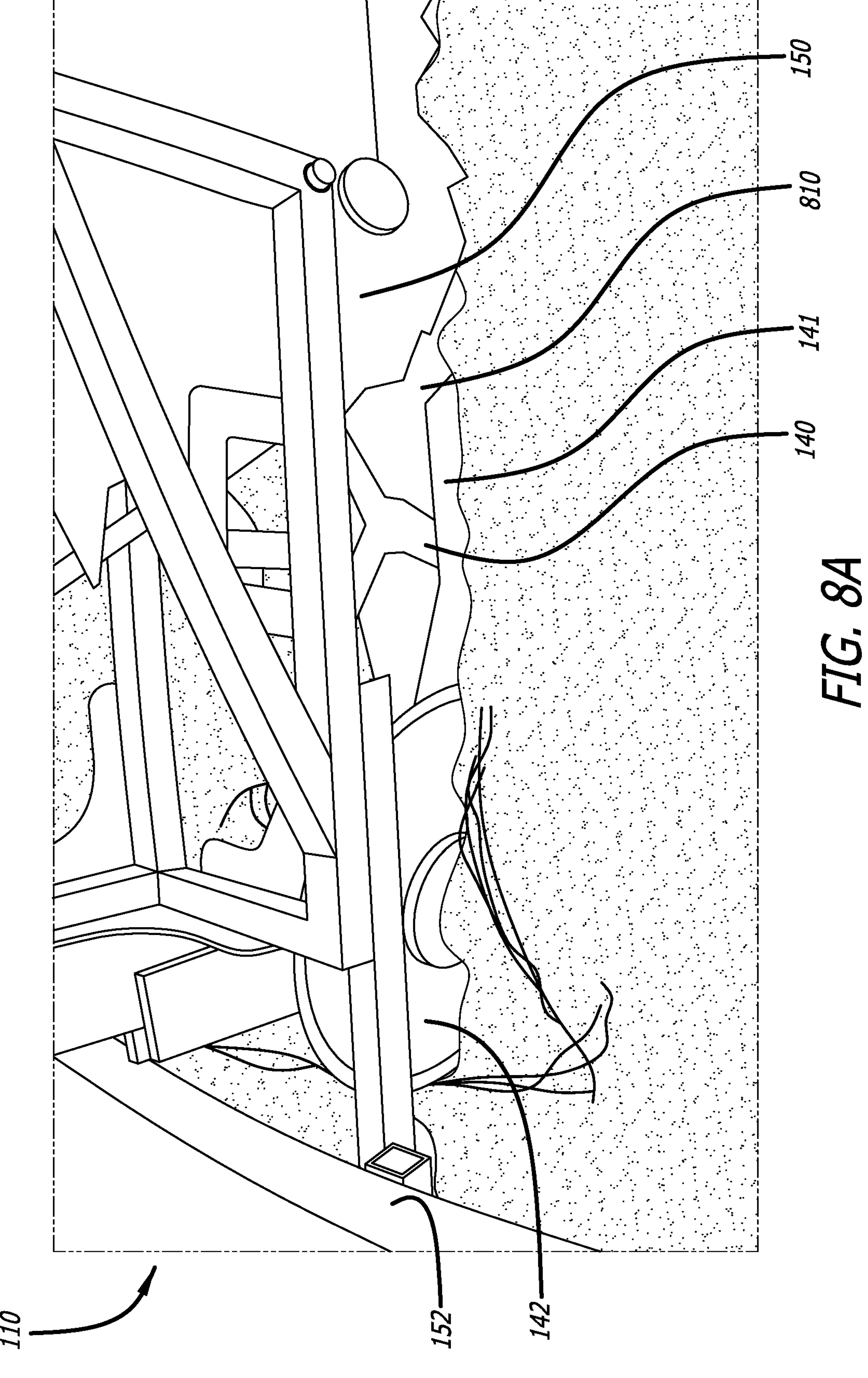
FIG. 8A illustrates a perspective view of a sword assembly of an automated transplanter, in accordance with an embodiment of the present disclosure.
Figure 8B:
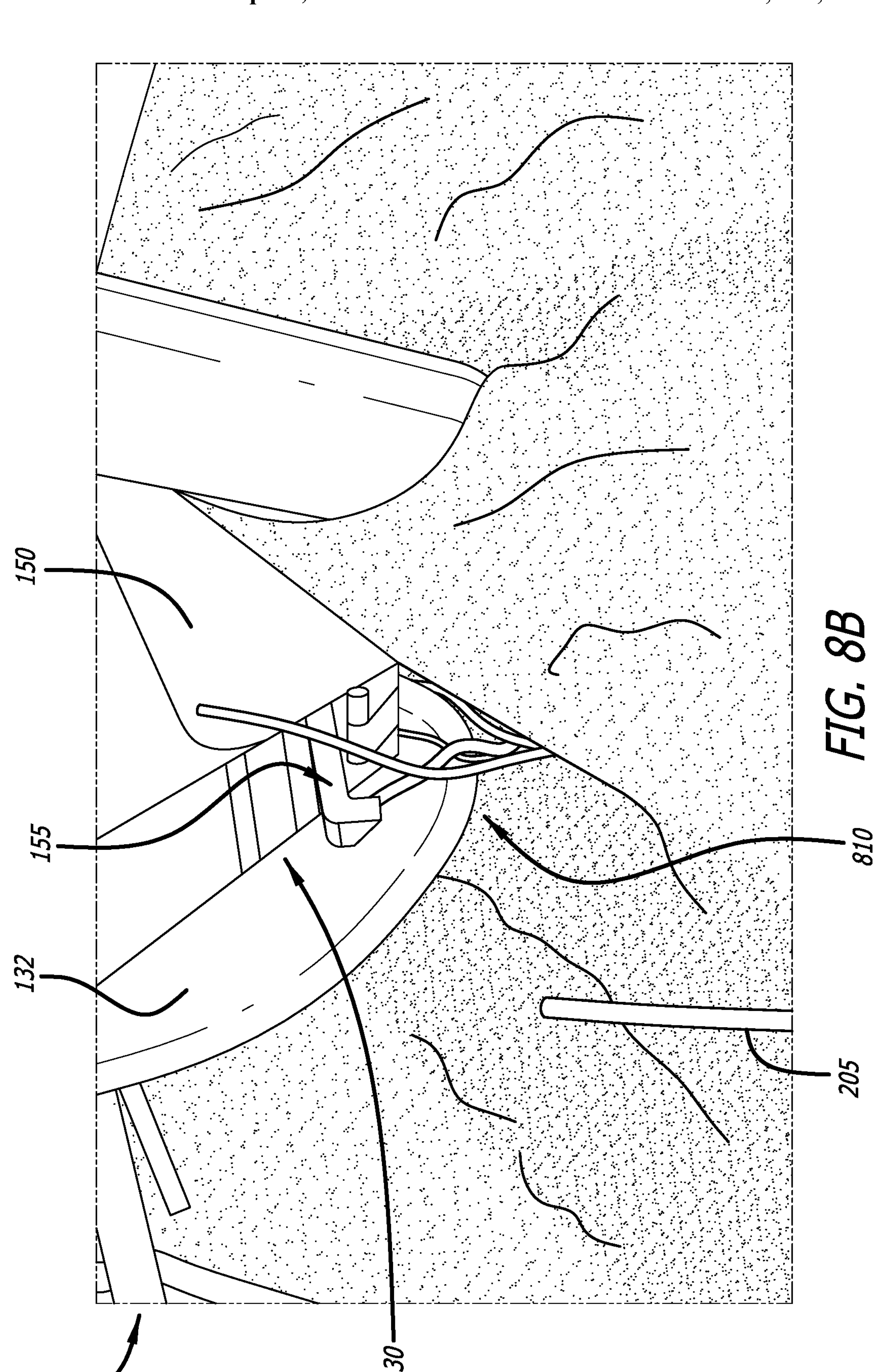
FIG. 8B illustrates a perspective view of a closing wheel assembly of an automated transplanter, in accordance with an embodiment of the present disclosure.

Referring now to FIGS. 8A-8B, a series of exemplary screenshot illustrations of the planter unit 110 of the transplanter 103 are shown, in accordance with embodiments of the disclosure. Similarly, in FIGS. 8C-8D, a series of cross-sectional view illustrations of a slip 205 transplanted with the planter unit 110 are shown, in accordance with embodiments of the disclosure. It should be understood that the planter unit 110 of the transplanter 103 depicted in FIGS. 8A-8D may be substantially similar to the planter unit 110 of the transplanter 103 depicted in FIGS. 1 and 3A-3D. For example, any of the mechanisms and assemblies of the planter unit 110 and/or any other units and mechanisms of the transplanter 103 depicted in FIGS. 8A-8D may be similar to the respective mechanisms and assemblies of the planter unit 110 of the transplanter 103 depicted in FIGS. 1 and 3A-3D. As such, the planter unit 110 depicted in FIGS. 8A-8D may be the same or substantially similar to the planter unit 110 depicted in FIGS. 1 and 3A-3D, with the exception that: FIG. 8A further illustrates an opening (or furrow sword opening) formed in soil 810 by the sword assembly 140; FIG. 8B further illustrates the opening in the soil 810 from another viewing angle, which also shows the closing assembly 130 in conjunction with the open rail track 155 of the open rail assembly 150 planting two transplanted slips 205 in the opening in the soil 810; and FIGS. 8C-8D further illustrates the transplanted slip 850 having several predetermined measurements and angles.

Figure 8D:
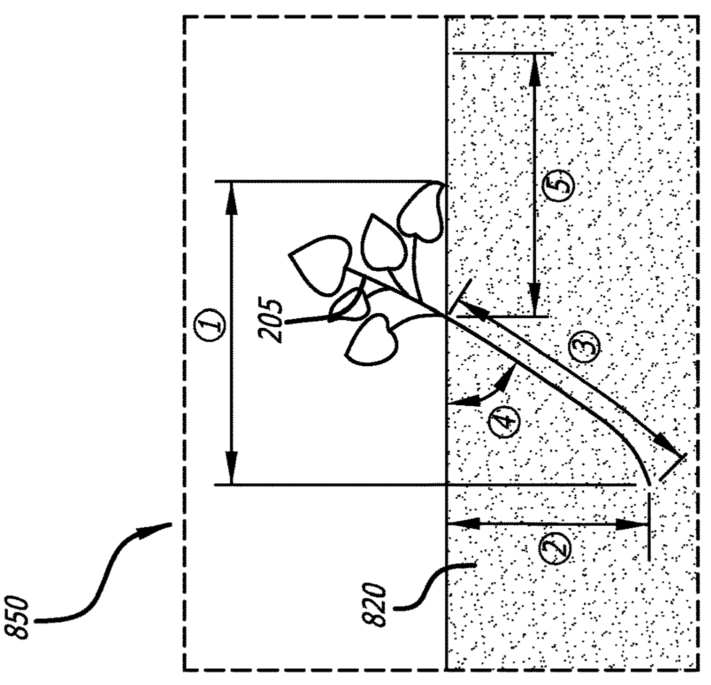
FIGS. 8C-8D illustrate a series of cross-sectional views of a slip transplanted with an automated transplanter using a brushed slip holder assembly, in accordance with embodiments of the present disclosure.
Figure 8C:
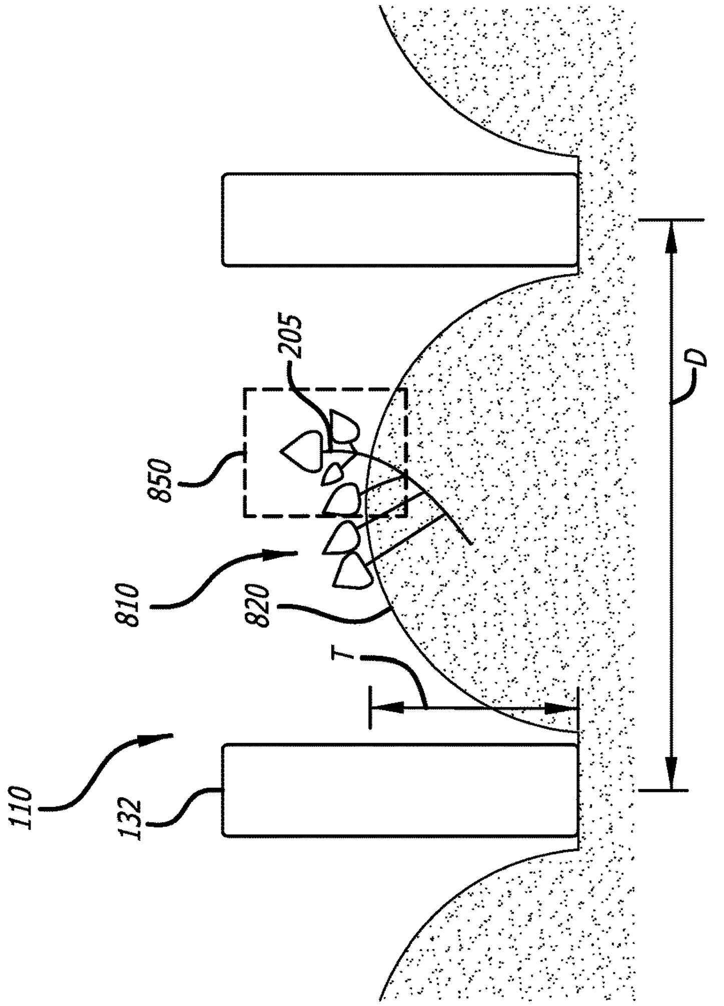

For example, as shown in FIG. 8C, the planter unit 110 may utilize the closing wheels 132 to output the transplanted slip 850 planted within the soil (or ground) 810. Also, as illustrated in FIG. 8C, when/if the active depth control planting mode is implemented, one or more planting measurements may be measured/collected in order to actively adjust the planting depth that may have been used to output the transplanted slip 850. For example, the planting measurements may include: (i) a distance between the closing wheels 132 (as depicted with "D"), and (ii) a depth (or thickness) of the soil 810 (as depicted with "T"), which may also be measured with the distance between the top level of the soil 810 and the bottommost level of the closing wheels 132.

Similarly, as shown in greater detail in FIG. 8D, other planting measurements may be collected when the slip 205 was planted into the soil 810 (as depicted with circle "1" through circle "5"). Furthermore, as noted, the planter unit 110 may be capable of diagonal (or angled/tilted) planting which may limit the number of potatoes but promotes hypertrophy and enables harvesting in a short time. In some embodiments, the planter unit 110 may also be configured to plant any desired length of slips 205 (i.e., from short to long slips 205), For example, the planting depth (or insertion length) of the slip 205 may be easily adjusted by the planter unit 110 by the one or more operational modes discussed above. In addition, the planter unit 110 may be used for reliable planting that allows stable insertion lengths of the slips 205. Furthermore, as discussed above, the planter unit 110 may be configured for automated and dynamic depth tracking by implementing the sensor 146 and/or controller 136 depicted in FIG. 1. For example, prior to planting the slip 205, the planter unit 110 may have automatically detected the depth (or height) of the ridge in the soil 810, such that the wheels 132 (and/or any other predetermined mechanisms of the planter unit 110, including the sword 142 and furrow sword opener 141 of FIG. 1) may have been controlled automatically to move up and down based on any detected depth level difference.

Figure 9:
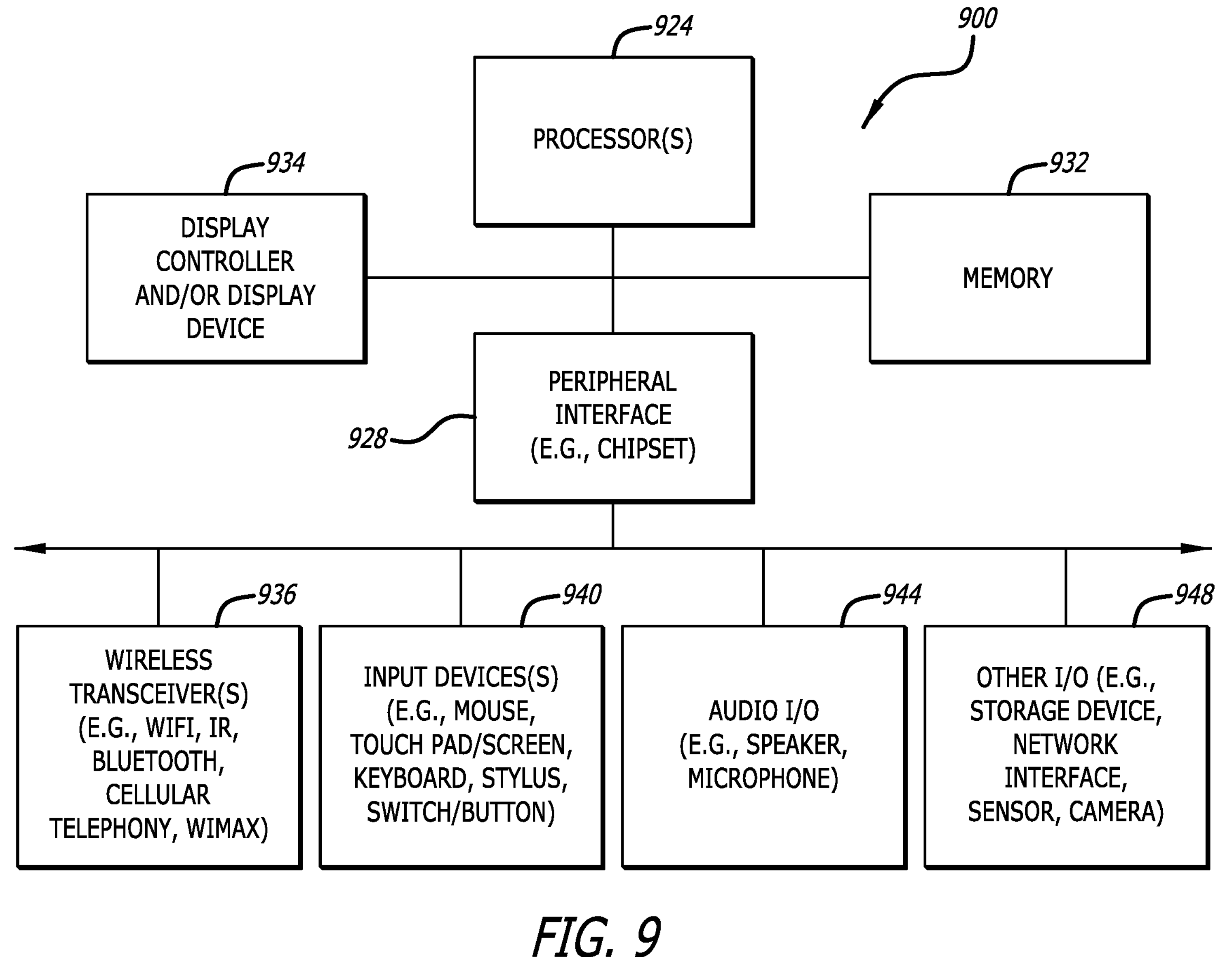
FIG. 9 illustrates is a block diagram of an exemplary data processing system that may be used with one or more embodiments of an automated transplanter having a plurality of brushed slip holder assemblies and operational mechanisms, in accordance with the present disclosure.

Referring now to FIG. 9, a block diagram of an exemplary data processing system 900 capable of implementing one or more brushed slip holder assemblies is shown, in accordance with embodiments of the disclosure. In some embodiments, the data processing system 900 may be implemented with the automated transplanter 103 depicted in FIG. 1. As discussed above, the automated transplanter 103 may include one or more electronic components, modules, controllers, and/or any other similar data processing devices. In accordance with several embodiments, the automated transplanter 103 may house a variety of electronic devices, components, and/or circuitry, such as one or more processors, memory devices, and/or the like that may be configured to run software applications suitable for operating the automated transplanter 103 (e.g., the active depth controller 136, the sensor 146, the electrical controls and controller 295, the singulation unit 190 and its brushed slip holder assemblies 203 (and/or any other operational mechanisms of the brushed slip holder assemblies 203, the main controller 705, etc.).

To this end, the exemplary embodiments of the data processing system 900 may be used in conjunction with the automated transplanter 103 to perform any of the processes or methods described herein. The data processing system 900 may represent circuitry associated with the one or more electrical controllers (or devices) of the transplanter 103, a desktop, a tablet, a server, a mobile phone, a personal digital assistant (PDA), a personal communicator, a network router or hub, a wireless access point (AP), a repeater, a set-top box, and/or any combination thereof. In an embodiment, the data processing system 900 may include one or more processor(s) 924 and a peripheral interface 928, also referred to herein as a chipset, to couple various components to the processor(s) 924, including a memory 932 and devices 936-948 via a bus or an interconnect. Processor(s) 924 may represent a single processor or multiple processors with a single processor core or multiple processor cores included therein. Processor(s) 924 may represent one or more general-purpose processors such as a microprocessor, a central processing unit (CPU), or the like.

More particularly, the processor(s) 924 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. The processor(s) may be configured to execute instructions for performing the operations and steps discussed herein.

In several embodiments, the peripheral interface 928 may include a memory control hub (MCH) and an input output control hub (ICH). The peripheral interface 928 may include a memory controller (not shown) that communicates with a memory 932. The peripheral interface 928 may also include a graphics interface that communicates with graphics subsystem 934, which may include a display controller and/or a display device. The peripheral interface 928 may communicate with the graphics subsystem 934 by way of an accelerated graphics port (AGP), a peripheral component interconnect (PCI) express bus, or any other type of interconnect.

An MCH may generally be referred to as a Northbridge, and similarly an ICH may generally be referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 924. In such a configuration, the peripheral interface 928 operates as an interface chip performing some functions of the MCH and ICH. Furthermore, a graphics accelerator may be integrated within the MCH or the processor (S0 924.

In most embodiments, the memory 932 may include one or more volatile storage (or memory) devices, such as random access memory (RAM), dynamic RAM (DRAM), synchronous DRAM (SDRAM), static RAM (SRAM), and/or any other similar types of storage devices. The memory 932 may store information including sequences of instructions that are executed by the processor 924, and/or any other device. For example, executable code and/or data of a variety of operating systems, device drivers, firmware (e.g., input output basic system or BIOS), and/or applications can be loaded in the memory 932 and executed by the one or more processors 924. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

In man embodiments, the peripheral interface 928 may provide an interface to IO devices, such as the devices 936-948, including wireless transceiver(s) 936, input device (s) 940, audio IO device(s) 944, and other IO devices 948. The wireless transceiver 936 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. The input device(s) 940 may include a mouse, a touch pad, a touch sensitive screen (e.g., such screen may be integrated with the graphics subsystem 934), a pointer device such as a stylus, and/or a keyboard (e.g., physical keyboard or a virtual keyboard displayed as part of a touch sensitive screen). For example, the input device 940 may include a touch screen controller coupled with a touch screen. The touch screen and touch screen controller may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

In several embodiments, the audio IO device(s) 944 may include a speaker and/or a microphone to facilitate voice-enabled functions, such as voice recognition, voice replication, digital recording, and/or telephony functions. Other optional devices 948 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), and/or a combination thereof. These optional devices 948 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Although one or more specified components of the data processing system 900 are depicted in FIG. 9, it should be understood that they are not intended to represent any particular architecture and/or manner of interconnecting any of those components, as such details are not germane to embodiments of the present disclosure. It should also be appreciated that network computers, handheld computers, mobile phones, and/or other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals-such as carrier waves, infrared signals, digital signals).

The processes or methods depicted in the preceding figures may be performed by processing logic that comprises hardware (e.g., circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process, when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A brushed slip holder assembly, comprising:

a slip bristle holder having a first body, a plurality of first legs, and a first opening, wherein the first opening is disposed through a center section of the first body, and each of the plurality of first legs is disposed over one of four corner sections of the first body;

a belt holder base disposed under the slip bristle holder, the belt holder base having a second body, a first hinged section, and one or more second openings, wherein the one or more second openings are disposed through a center section of the second body; and an intermediate double-sided hinge disposed between the slip bristle holder and the belt holder base, the intermediate double-sided hinge used to operably couple the slip bristle holder onto the belt holder base, wherein the intermediate double-sided hinge has a third body, a second hinged section, a third hinged section, and a fourth opening, wherein the fourth opening is disposed through a center section of the third body.

2. The brushed slip holder assembly of claim 1, further comprising a belt slip holder hinged to a belt and having a fourth body, a plurality of second legs, and a fifth opening, wherein the fifth opening is disposed through a center section of the fourth body, and each of the plurality of second legs is disposed on one of four corner sections of the fourth body.

3. The brushed slip holder assembly of claim 2, wherein the belt slip holder is disposed over the intermediate double-sided hinge, and wherein the belt slip holder is operably coupled to the third hinged section of the intermediate double-sided hinge with a hinged pin.

4. The brushed slip holder assembly of claim 3, wherein the fourth body of the belt slip holder is disposed vertically over and perpendicular to both the first body of the slip bristle holder and the third body of the intermediate double-sided hinge.

5. The brushed slip holder assembly of claim 1, further comprising one or more bristle sections coupled to and disposed over the first body of the slip bristle holder.

6. The brushed slip holder assembly of claim 5, wherein each of the bristle sections is operably coupled to one of the plurality of first legs of the slip bristle holder.

7. The brushed slip holder assembly of claim 6, wherein each of the bristle sections has a head section and a body section.

8. The brushed slip holder assembly of claim 7, wherein each of the first legs of the slip bristle holder has an inner opening used to surround and operably engage with each of the head sections of the bristle sections, and wherein each of the body sections of the bristle sections extends outwardly away from the head section and the inner opening, wherein each end of the body sections is disposed adjacent to another end of the body sections, and wherein the one end of the body sections is separated from the other end of the body sections by a minimal space in between both ends of the respective body sections.

9. The brushed slip holder assembly of claim 1, further comprising one or more tension springs operably coupled to the first hinged section of the belt holder base and the second hinged section of the intermediate double-sided hinge, wherein the second hinged section of the intermediate double-sided hinge is operably coupled to the first hinged section of the bristle holder base with a first hinged pin.

10. An automated slip transplanter, comprising:

a planter unit configured to plant a consistent row of evenly spaced slips in a field;

a singulation unit having a plurality of automated grippers and a plurality of slip cartridges, the singulation unit configured to continuously singulate harvested slips that are stored in the plurality of slip cartridges; and a conveyor belt having a belt and a plurality of brushed slip holder assemblies pivotally coupled to and disposed on the belt, the plurality of brushed slip holder assemblies is configured to receive the singulated slips from the plurality of automated grippers, and the belt is configured to transfer the received slips to the planter unit using the plurality of brushed slip holder assemblies;

wherein each of the plurality of brushed slip holder assemblies further comprises:

a slip bristle holder having a first body, a plurality of first legs, and a first opening, wherein the first opening is disposed through a center section of the first body, and each of the plurality of first legs is disposed over one of four corner sections of the first body;

a belt holder base disposed under the slip bristle holder, the belt holder base having a second body, a first hinged section, and one or more second openings, wherein the one or more second openings are disposed through a center section of the second body; and an intermediate double-sided hinge disposed between the slip bristle holder and the belt holder base, the intermediate double-sided hinge used to operably couple the slip bristle holder onto the belt holder base, wherein the intermediate double-sided hinge has a third body, a second hinged section, a third hinged section, and a fourth opening, wherein the fourth opening is disposed through a center section of the third body.

11. The automated slip transplanter of claim 10, wherein the planter unit comprises a sword assembly and an open rail assembly, wherein the conveyor belt is configured to sequentially transfer the received slips to an open rail track of the open rail assembly, and wherein the open rail track is configured to deliver the singulated slips to the sword assembly, such that the sword assembly thereby plants the consistent row of evenly spaced slips in the field.

12. The automated slip transplanter of claim 10, wherein the conveyor belt is operably coupled to the singulation unit and the planter unit, wherein the singulation unit is vertically disposed on the planter unit, and wherein each of the plurality of automated grippers are configured to singularly grasp a harvested slip from one of the plurality of slip cartridges and discharge each of the singulated slips on the conveyor belt.

13. The automated slip transplanter of claim 10, wherein each of the brushed slip holder assemblies further comprises a belt slip holder hinged to a belt and having a fourth body, a plurality of second legs, and a fifth opening, wherein the fifth opening is disposed through a center section of the fourth body, and each of the plurality of second legs is disposed on one of four corner sections of the fourth body.

14. The automated slip transplanter of claim 13, wherein each of the brushed slip holder assemblies further comprises one or more tension springs operably coupled to the first hinged section of the belt holder base and the second hinged section of the intermediate double-sided hinge, wherein the second hinged section of the intermediate double-sided hinge is operably coupled to the first hinged section of the belt holder base with a first hinged pin.

15. The automated slip transplanter of claim 14, wherein the belt slip holder is disposed over the intermediate double-sided hinge, and wherein the belt slip holder is operably coupled to the third hinged section of the intermediate double-sided hinge with a hinged pin.

16. The automated slip transplanter of claim 15, wherein the fourth body of the belt slip holder is disposed vertically over and perpendicular to both the first body of the slip bristle holder and the third body of the intermediate double-sided hinge.

17. The automated slip transplanter of claim 16, wherein each of the bristle sections is operably coupled to one of the plurality of first legs of the slip bristle holder.

18. The automated slip transplanter of claim 17, further comprising one or more bristle sections coupled to and disposed over the first body of the slip bristle holder.

19. The automated slip transplanter of claim 18, wherein each of the bristle sections has a head section and a body section.

20. The automated slip transplanter of claim 19, wherein each of the first legs of the slip bristle holder has an inner opening used to surround and operably engage with each of the head sections of the bristle sections, and wherein each of the body sections of the bristle sections extends outwardly away from the head section and the inner opening, wherein each end of the body sections is disposed adjacent to another end of the body sections, and wherein the one end of the body sections is separated from the other end of the body sections by a minimal space in between both ends of the respective body sections.

* * * * *